(12) United States Patent
Li et al.

(10) Patent No.: US 6,398,112 B1
(45) Date of Patent: Jun. 4, 2002

(54) APPARATUS AND METHOD FOR READING INDICIA USING CHARGE COUPLED DEVICE AND SCANNING LASER BEAM TECHNOLOGY

(75) Inventors: Yajun Li, Oakdale; Joseph Katz, Stony Brook; Jerome Swartz, Old Field; Edward Barkan, Miller Place, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/540,404

(22) Filed: Mar. 31, 2000

Related U.S. Application Data

(60) Continuation of application No. 08/833,650, filed on Apr. 8, 1997, now Pat. No. 6,123,264, which is a division of application No. 08/269,170, filed on Jun. 30, 1994, now Pat. No. 5,672,858.

(51) Int. Cl.[7] .................................................. G06K 7/10
(52) U.S. Cl. ........................ 235/462.01; 235/462.25; 235/462.17
(58) Field of Search ..................... 235/462.01, 472.01, 235/462.07–462.13, 462.25, 462.32, 462.42, 462.4

(56) References Cited

U.S. PATENT DOCUMENTS

| | | |
|---|---|---|
| 2,216,716 A | 10/1940 | Withen |
| 3,393,600 A | 7/1968 | Bess |
| 3,812,325 A | 5/1974 | Schmidt |
| 3,992,574 A | 11/1976 | Bouwhuis et al. |
| 4,096,992 A | 6/1978 | Nojiri et al. |
| 4,136,821 A | 1/1979 | Suguira et al. |
| 4,147,295 A | 4/1979 | Nojiri et al. |
| 4,346,292 A | 8/1982 | Routt, Jr. et al. |

(List continued on next page.)

FOREIGN PATENT DOCUMENTS

| | | |
|---|---|---|
| JP | 0 026 623 | 3/1978 |
| JP | 0 028 336 | 3/1978 |
| JP | 0 129 976 | 10/1981 |
| JP | 0 046 474 | 3/1983 |
| JP | 0 172 081 | 9/1984 |
| JP | 0 016 477 | 7/1987 |
| JP | 0 172 385 | 7/1988 |

Primary Examiner—Thien M. Le
(74) Attorney, Agent, or Firm—Kirschtein, et al.

(57) ABSTRACT

A scanning device for reading indicia of differing light reflectivity, including bar code or matrix array symbols, has a single light emitter, such as a laser or light emitting diode, for generating a scanning light beam to visually illuminate sequential portions of the indicia. A sensor, such as a charge coupled or other solid state imaging device, simultaneously detects light reflected from portions of the indicia and generates an electrical signal representative of the spacial intensity variations the portions of the indicia. The scanning device may also include an ambient light sensor, and a second light emitter for use only in aiming or orienting the scanning device. A photodetector may also be provided to separately detect one symbol virtually simultaneous with the detection of another symbol by the sensor or to provide dual modalities. A method for reading indicia is also provided.

19 Claims, 22 Drawing Sheets

U.S. PATENT DOCUMENTS

| | | | |
|---|---|---|---|
| 4,542,528 A | | 9/1985 | Sanner et al. |
| 4,877,949 A | * | 10/1989 | Danielson et al. .......... 235/462 |
| 4,939,356 A | | 7/1990 | Rando et al. |
| 5,010,241 A | | 4/1991 | Butterworth |
| 5,216,230 A | | 6/1993 | Nakazawa |
| 5,235,167 A | | 8/1993 | Dvorkis et al. |
| 5,280,161 A | * | 1/1994 | Niwa ......................... 235/462 |
| 5,396,054 A | * | 3/1995 | Krichever et al. .......... 235/462 |
| 5,410,141 A | | 4/1995 | Koenck et al. |
| 5,504,316 A | * | 4/1996 | Bridgelall et al. .......... 235/462 |
| 5,528,022 A | * | 6/1996 | Nakazawa .................. 235/436 |
| 5,534,684 A | | 7/1996 | Danielson |
| 5,591,955 A | * | 1/1997 | Laser .......................... 235/472 |
| 5,600,121 A | | 2/1997 | Kahn et al. |
| 5,616,909 A | | 4/1997 | Arackellian |
| 5,617,174 A | | 4/1997 | Mikami |
| 5,637,856 A | * | 6/1997 | Bridgelall et al. .......... 235/472 |
| 5,736,725 A | | 4/1998 | Danielson |
| 5,763,864 A | | 6/1998 | O'Hagan et al. ........... 235/472 |
| 5,770,847 A | | 6/1998 | Olmstead |
| 5,814,803 A | | 9/1998 | Olmstead et al. |
| 5,914,477 A | | 6/1999 | Wang ...................... 235/462.1 |
| 5,992,744 A | | 11/1999 | Smith et al. ........... 235/462.11 |

\* cited by examiner

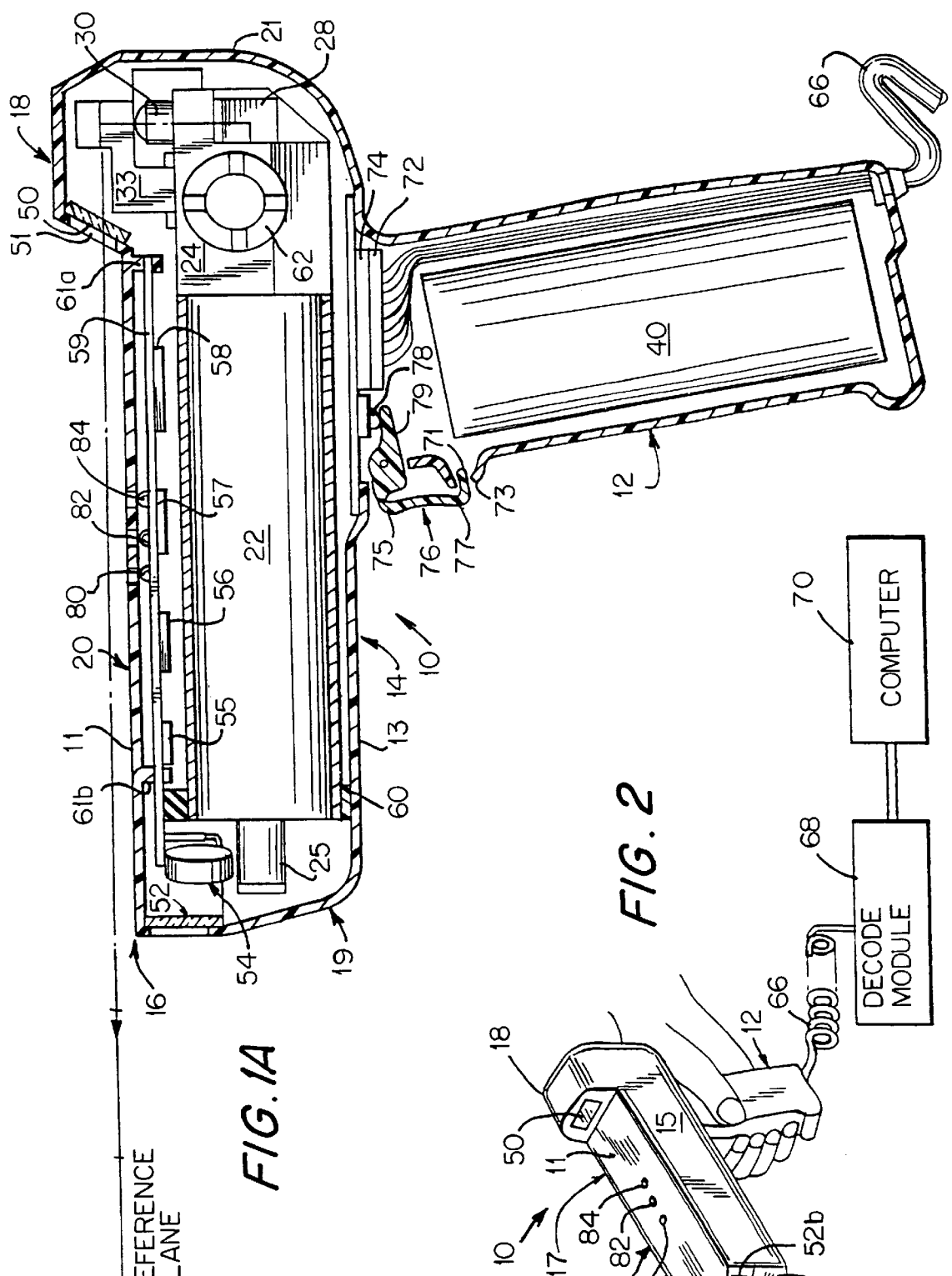

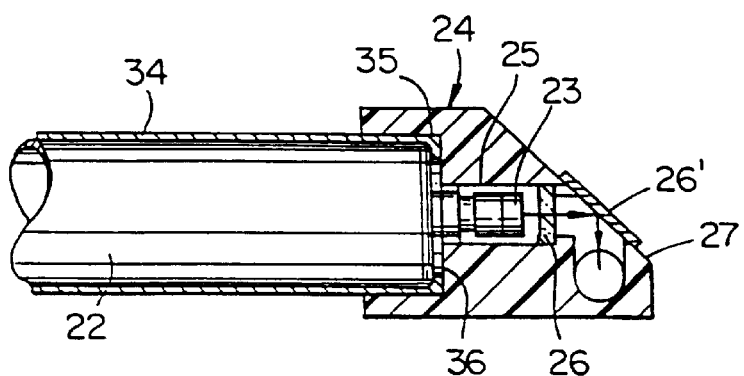
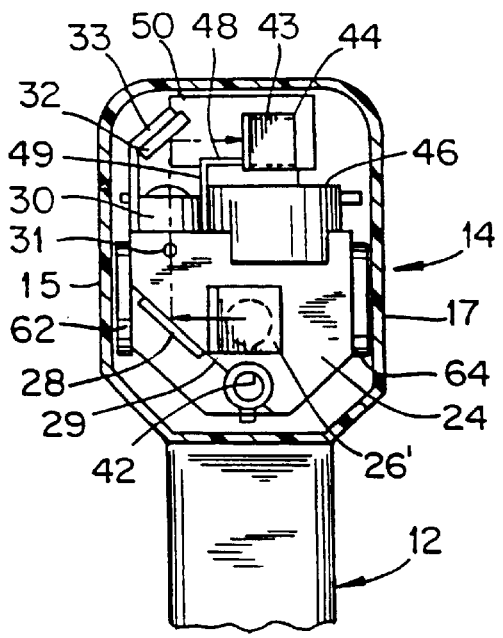
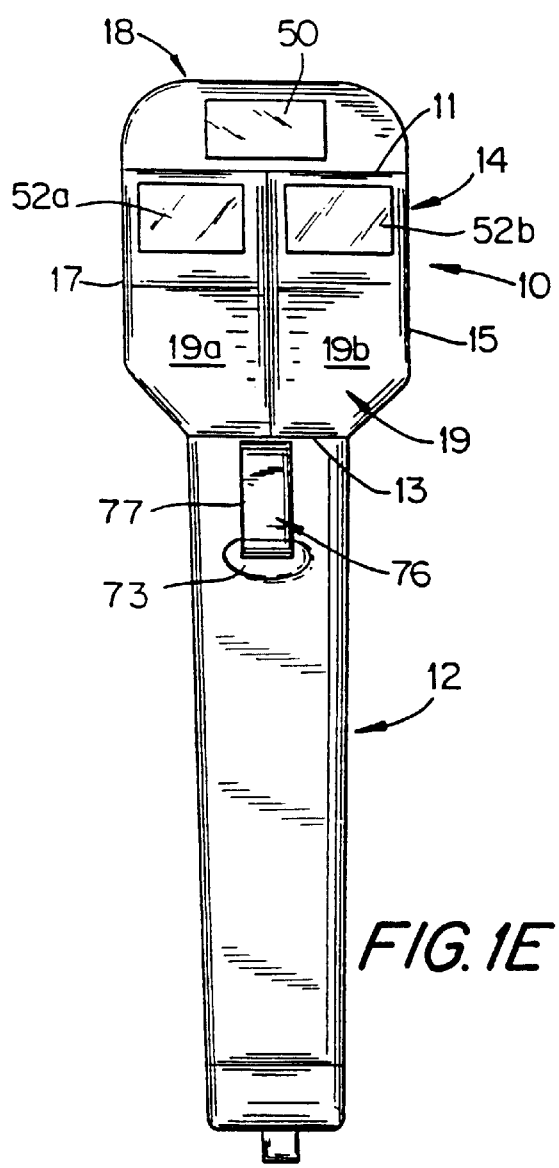
FIG. 1D
FIG. 1C
FIG. 1E

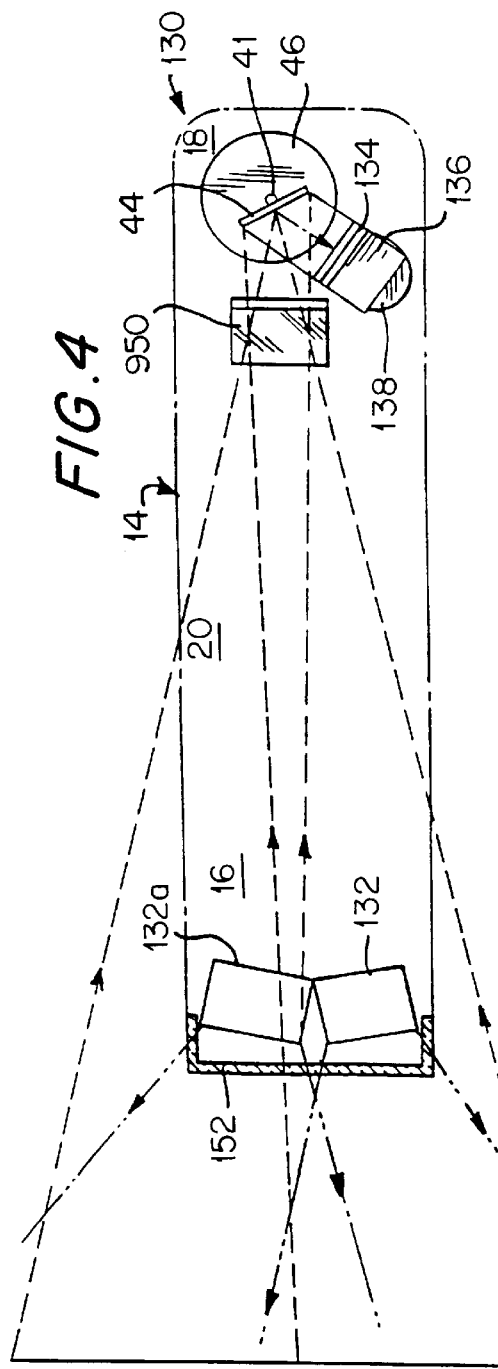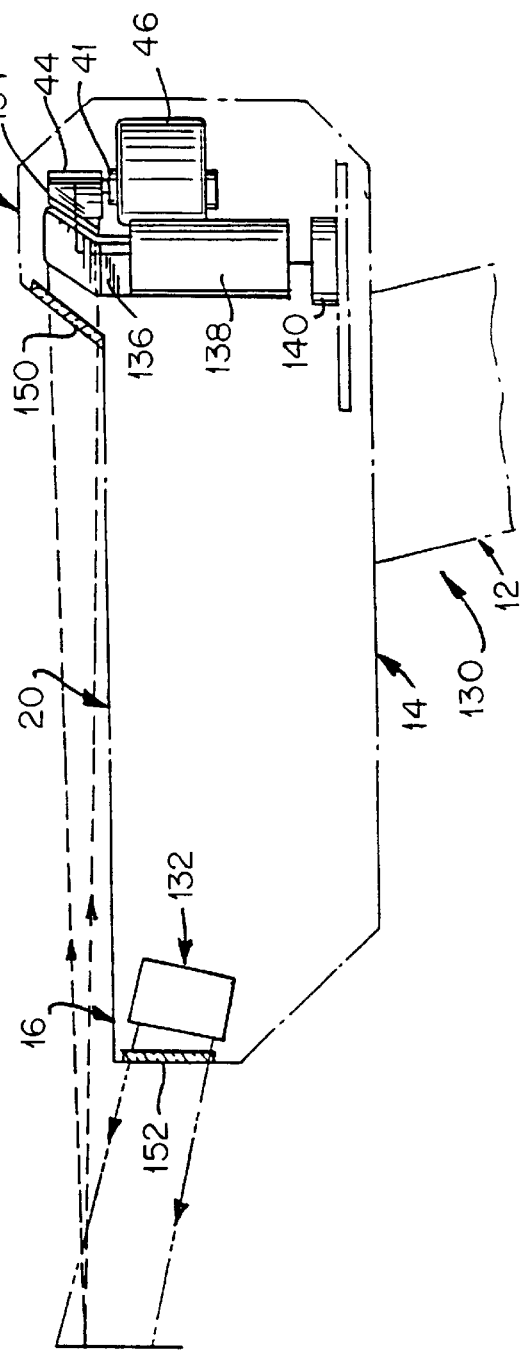

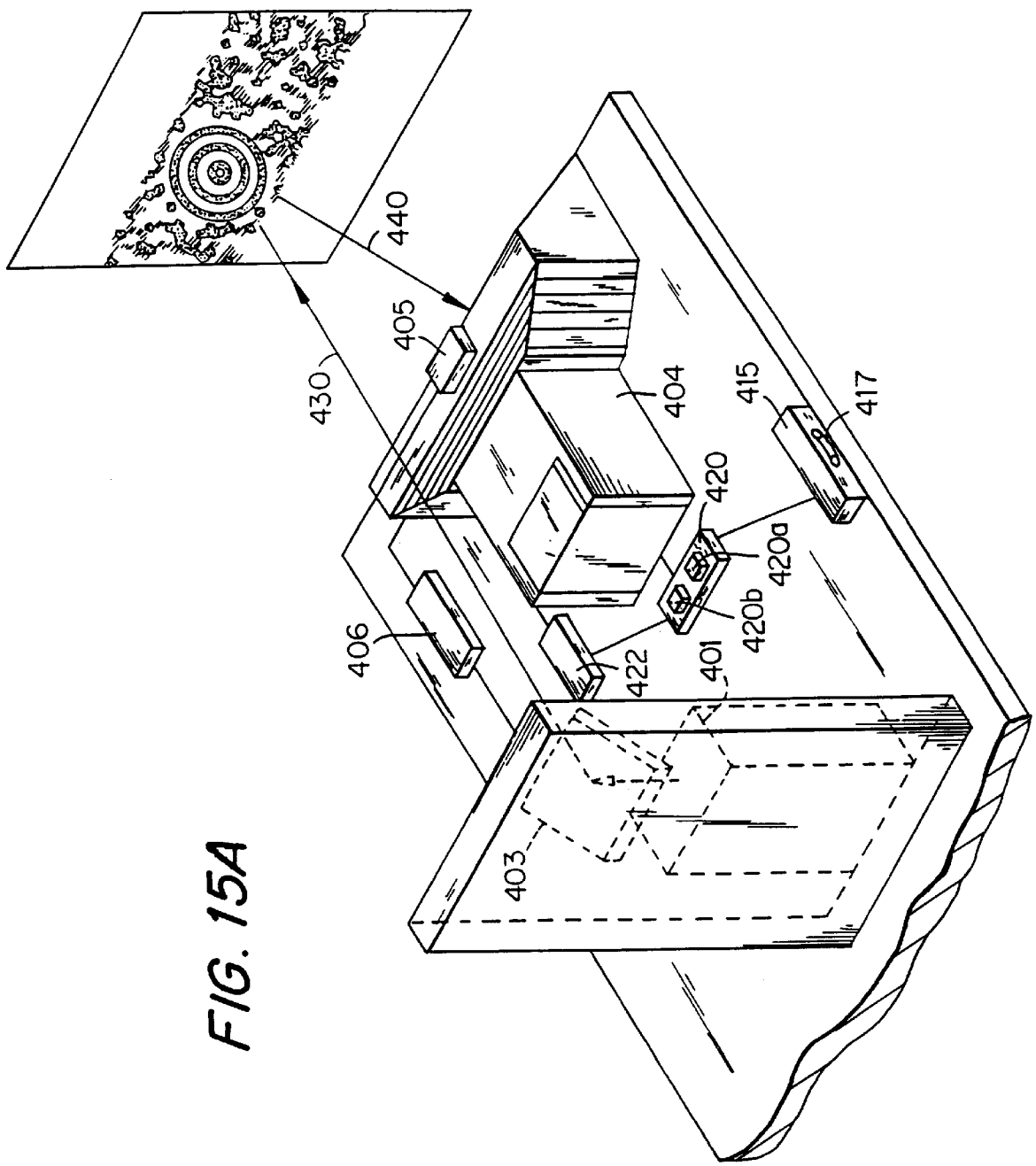

APPARATUS AND METHOD FOR READING INDICIA USING CHARGE COUPLED DEVICE AND SCANNING LASER BEAM TECHNOLOGY

This is a continuation of application Ser. No. 08/833,650, filed Apr. 8. 1997, now U.S. Pat No. 6,123,264 which is a divisional of application Ser. No. 08/269,170 filed Jun. 30, 1994, now U.S. Pat. No. 5,672,858.

BACKGROUND OF THE INVENTION

1. Field of the Invention

This invention generally relates to an apparatus and method operative for electro-optically reading indicia having parts of different light reflectivity, for example, bar code or matrix array symbols, and, more particularly, to apparatus using both charge coupled device (CCD) technology and laser beam scanning technology for properly positioning, orienting and/or aiming such apparatus and reading one or two-dimensional bar code symbols, and to a method therefor.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semiconductor devices as the light source in scanning systems is especially desirable because of their small size, low cost and low voltage requirements. The laser beam is optically modified, typically by a focusing optical assembly, to form a beam spot of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specific by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies, a unique "start" and "stop" character is used to indicate where the bar code begins and ends. A number of different bar code symbologies exist. These symbologies include UPC/EAN, Code 39, Code 128, Codabar, and Interleaved 2 of 5, etc.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is incorporated herein by reference. Another two-dimensional symbology, known as "PDF417", is described in U.S. Pat. application Ser. No. 461,881, now U.S. Pat. No. 5,304,786. Still other symbologies have been developed in which the symbol is comprised of a matrix array made up of hexagonal, square, polygonal and/or other geometric shapes. Prior art FIGS. 24A–24C depict exemplary known matrix and other type symbols. Such symbols are further described in, for example, U.S. Pat. Nos. 5,276,315 and 4,794,239. Such matrix symbols may include Vericode(TM), Datacode(TM) and UPSCODE (TM).

In the laser beam scanning systems known in the art, the laser light beam is directed by a lens or similar optical components along a light path toward a target that includes a bar code or other symbol on the surface. The moving-beam scanner operates by repetitively scanning the light beam in a line or series of lines across the symbol by means of motion of a scanning component, such as the light source itself or a mirror, disposed in the path of the light beam. The scanning component may either sweep the beam spot across the symbol and trace a scan line or pattern across the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which ensures the capture of a portion of the light which is reflected or scattered off the symbol is detected and converted into an electrical signal. Electronic circuitry or software decode the electrical signal into a digital representation of the data represented by the symbol that has been scanned. For example, the analog electrical signal operated by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

The decoding process in known bar code reading systems usually works in the following way. The decoder receives the pulse width modulated digital signal from the bar code reader, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Moving-beam laser scanners are not the only type of optical instrument capable of reading bar code symbols. Another type of bar code reader particularly relevant to the present invention is one which incorporates detectors based upon charge coupled device (CCD) technology. In such prior art readers the size of the detector is typically smaller than the symbol to be read because of the image reduction by the objective lens in front of the CCD. The entire symbol is flooded with light from a light source such as light emitting diodes (LED) in the reader, and each CCD cell is sequentially read out to determine the presence of a bar or a space.

The working range of CCD bar code scanners can be rather limited as compared to laser based scanners and is especially low for CCD based scanners with an LED illumination source. Other features of CCD based bar code scanners are set forth in parent applications Ser. Nos. 317,553 and 717,771 which are hereby incorporated by reference, and which are illustrative of the earlier technological techniques proposed for use in CCD scanners to acquire and read two-dimensional indicia.

It is a general object of the present invention to provide an improved indicia scanner without the limitations of prior art readers.

It is a further object of the present invention to provide an indicia scanner capable of providing the features of both a flying spot light beam scanner and an imaging scanner in a single unit.

It is a still further object of the present invention to provide a scanner for reading both two-dimensional or more complex indicia and linear bar codes.

It is yet another object of the invention to provide a handheld indicia reader that is capable of aiming or being oriented and also imaging the field of view.

It is still another object of the invention to both perform laser scanning and CCD imaging either simultaneously, alternatively, or on a time-division multiplexed basis.

It is also an object of the invention to provide an indicia reader capable of automatically and adaptively reading indicia of different symbology types, including indicia comprised of a matrix array of geometric shapes such as a UPSCODE(TM), in close spatial proximity.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention a scanning device for scanning or reading indicia of differing light reflectivity, such as bar code or matrix array symbols containing optically encoded information, is provided. The scanning device has a single light emitter, preferably including a laser or light emitting diode, for generating a scanning light beam to visually illuminate sequential portions of the indicia and produce reflected light from the indicia. A sensor, such as a linear array of a charge coupled device or two-dimensional array of a solid state imaging device simultaneously detects light from the light beam or ambient light reflected from portions of the indicia and generates an electrical signal representative of the reflected light from the portions of the indicia. The sensor may operate in either a scanning or non-scanning mode, the latter being similar to that of a single photodetector, or in both modes. When operating in a scanning mode, the sensor may scan a field of view at a rate faster or substantially slower than the scanning light beam. The sensor may be controlled to scan a field of view only periodically and may function as a range detector to detect the distance between the scanning device and targeted indicia. The sensors operation as a range detector is further described below. The emitter and sensor may be disposed in a hand-held housing to allow for portable operation.

According to other aspects of the invention, the scanning device may also include an ambient light sensor for detecting the level of the ambient light in a field of view and producing an output signal if the ambient light is above a threshold value, i.e. the value at which sufficient ambient light exist for a satisfactory read of the indicia without additional light being reflected from the indicia. An activator can also be included to activate the emitter, preferably automatically, in response to the output signal. The activator may also be responsive to the electrical signal generated by the sensor. In this way, the emitter is activated, for example, only after the sensor has obtained a satisfactory read on one symbol and the emitter continues to emit a light beam until the sensor has obtained a satisfactory read of the next symbol. Unlike some prior art bar code readers, the light beam need not be deactivated after a successful decode of a symbol. More particularly, the light beam could be deactivated only if no decode had taken place after a predetermined time.

A processor for processing the electrical signal is also preferably provided. The processor typically includes an analog to digital converter for converting the electrical signal into a corresponding digital signal, and a decoder for decoding the digital signal in order to obtain the information encoded within the symbol. The processor may include a discriminator for determining whether the targeted symbol is a linear or multidimensional symbol, or a bar code symbol of a certain symbology type. A selection device is beneficially provided for deactivating the light emitter if it is determined that the targeted symbol is a multidimensional bar code symbol. The discriminator may be adapted to more generally discriminate between indicia of different symbology types or to discriminate between indicia of any desired symbology types. For example, the discriminator may be adapted to look for symbols conforming to UPSCODE(TM). The sensor can be adapted to detect visible light reflected from a portion of the symbol which is formed of a bull's eye mark. Such marks are being more frequently used in conjunction with symbols formed of a matrix array of geometric shapes, such as those conforming with UPSCODE(TM) symbology.

In a second embodiment of the invention for reading indicia of the types described above, a scanning device is provided with a first light emitter, for example a light emitting diode, which generates a light beam directed along a path toward the indicia, say a bar code symbol, so as to illuminate a field of view including the indicia. A second light emitter, such as a laser diode, generates a scanning light beam to visually illuminate sequential portions of the symbol so as to produce reflected light from the indicia. A sensor, preferably a linear charge coupled or two-dimensional solid state imaging device, senses or images the reflected light and generates an electrical signal responsive to the detected light indicative of the indicia. The light from the first light emitter is thus used only for aiming or orienting the scanning device. If desired, the first and second light emitters can be disposed in the same housing. The linear charge coupled device is beneficially arranged within the scanning device so that the elongated dimension of the charge coupled device is parallel to the scanning light beam.

According to other aspects of this second embodiment, a ambient light sensor identical in function to that described above may also be provided. An activator to activate one or both of the light emitters responsive to the output signal of the ambient light sensor is beneficially included as part of the scanning device. The activator may also be made responsive to the electrical signal, as discussed previously in the context of the first embodiment. The scanning device may also include a processor like that described above, including converter, decoder, discriminator, selection device and other features of the processor described above. The sensor can, likewise, be adapted to detect visible light reflected from a portion of the symbol which is in the form of a bull's eye mark.

In accordance with yet another embodiment of the invention, a scanning device for reading indicia, such as that previously described, having parts of different light reflectivity has a light source, such as a laser or light emitting diode, for generating a visible light beam. An optical element, preferably a mirror, directs the visible light beam such that a scan line is formed across the indicia. A sensor, preferably a charge coupled or other solid state imaging device, which includes an array of detection elements, images the reflection of light from the indicia, for example visible light from the visible light beam or ambient light, or a combination of the two, and generates an electrical signal representing the reflection of the light from the indicia or, stated another way, the spatial intensity variations of the indicia. The individual detection elements can be scanned at a variable scanning rate if desired. An actable controller can be provided to change the element scanning rate as desired. The scanning device may also include an integrator for processing the output of the individual detection elements to produce a single output signal. Preferably, auto-focus optics to receive the reflected light and adjust the focal point of the image on the array of detection elements are also provided. Processing circuitry for processing an electrical signal generated by the sensor may be provided. The circuitry may include a determining means which determines if the targeted indicia is a matrix code or bar code symbol, or of other differing symbology types, such as a linear or multidimensional symbol. A selection means deactivates the light emitter and/or the sensor if it is determined by the determining means that the symbol is of a particular symbology type, for example a bar code of certain symbology category.

This embodiment is particularly suitable for reading indicia, such as a bar code symbol, located within a range of approximately four to ten inches from the scan head of the scanning device. The light source, optical element and sensor can be beneficially housed in a light weight portable housing. The housing may also include an actuable controller as well as a wireless transmitter for transmitting information to a remote receiver.

The scanning device in accordance with this later embodiment may also include any or all of the other features, or be adapted to perform any or all of the other functions, discussed above in connection with the other described embodiments of the invention.

Additionally, in accordance with other aspects of this later embodiment, a photodetector, such as a photodiode, for detecting the reflection of light from the visible light beam off the indicia may be provided. With the photodetector incorporated in the scanning device, the sensor is beneficially used to detect either ambient light or light from the light beam reflected off one portion of the indicia, or is utilized to estimate the distance or range between the radii and the target, while the photodetector is used to detect light from the scanning light beam reflected off another portion of the indicia. Such an arrangement is particularly beneficial when the indicia is comprised of two adjacent or otherwise proximately located symbols. For example, the sensor may be used to detect reflected light from a matrix array symbol, perhaps one conforming to UPSCODE(TM), and he photodetector used to detect a one dimensional bar code symbol.

According to still further aspects of this later embodiment, the scanner can be adapted to operate in two or more distinct modalities, for example one for reading symbols of one symbology type such as stacked or other adjacent rows of linear bar codes, and the other for reading symbols of a different symbology type, such as matrix codes.

If two modalities are required, the scanner preferably includes two symbol discriminators one of which is adapted to determine if the symbol is of one predetermined category or symbology type and the other adapted to determine if the symbol is of another predetermined category. A signal is generated by one symbol discriminator if the symbol being imaged by the sensor does not conform to one of the symbology types. The sensor is deactivated in response to this signal. A signal is generated by the other symbol discriminator if the symbol detected by the photodetector does not conform to the other of the symbology types. The photodetector is deactivated in response to this signal. By directing both the sensor and photodetector to the same targeted symbol, the category of the targeted symbol is thereby indicated, since the symbol necessarily conforms to the predetermined symbology type acceptable to the symbol discriminator which does generate a signal to deactivate its associate detector. If both discriminators generate signals then the category of the targeted signal is necessarily outside the predetermined categories for the scanner. Either of the two modalities are therefore automatically selected in response to a signal received from one of two symbol discriminators. Thus, for example, in one modality a charge coupled device is activated to read matrix codes by imaging and in the other modality a photodiode is activated to read bar codes using light from a flying spot light beam or laser line reflected off the symbol.

In accordance with still other aspects of the invention as embodied in this later embodiment, the same sensor or, a second sensor is provided for ranging. The sensor senses the change in the image produced by the scanned visible light beam as the separation distance between the indicia and the scanning device is increased or decreased. The sensor also generates an electrical signal indicative of the separation distance. Preferably the sensor is a position sensitive sensor or an array of detection elements.

In accordance with the scanning method of the present invention, a scanning light beam, preferably a visible laser light beam, is generated by a single light source to visually illuminate sequential portions of the indicia in order to produce reflected light from the indicia. The light reflected from portions of the indicia, which may be ambient light or light from the light beam, is simultaneously sensed preferably using an imaging technique. The sensing may include detecting visible light reflected from a portion of the indicia which is in the form of a bull's eye mark. The sensing may be performed only periodically. Additionally, ranging may also be performed to determine the distance to indicia. An electrical signal representative of the detected light reflected from the portions of the indicia is generated.

According to other aspects of the inventive method, the level of the ambient light in a field of view is detected and an output signal is produced if the ambient light is above a threshold value. The light beam is generated responsive to the output signal. Beneficially, the light beam can also be generated responsive to the electrical signal.

The electrical signal may be processed to obtain an indication of the type of indicia being scanned. Thus, the processing may include a first threshold of determining whether the indicia is a linear or multidimensional symbol, or a bar code symbol of a particular symbology type, and generating the scanning light beam only if the bar code symbol is determined to be a linear bar code symbol. The processing can also include generating and processing a digitized signal corresponding to the electrical signal. The processing may include discriminating between indicia of different symbology type's, linear, two-dimensional or stacked bar codes, matrix codes, or other types of indicia patterns.

According to another method of the present invention, two light beams are generated. One of the beams is directed so as to illuminate the entire indicia simultaneously and produce first reflected light from the indicia. The other beam, preferably a laser light beam, is directed so as to scan the field of view, that is, to visually illuminate spatially sequential portions of the indicia and produce second reflected light from the indicia. The two light beams may be directed to different parts of the target so that the reflected light from each distinct part can be distinguished. Alternatively, if the target area is small, the two light beams can be time division multiplexed, so that only one beam is active at a given time. The first reflected light is sensed, preferably by an imaging technique, and an electrical signal is generated representing the sensed light. The sensing or imaging may include detecting visible light reflected from a portion of the indicia which is in the form of a bull's eye mark. The light from the second beam, i.e. the scanned beam, may be detected by a single detector, or the same sensor used to detect the first beam, except the sensor is not operated in the scanning mode.

According to other beneficial aspects of this second method, the level of ambient light in a field of view is detected and an output signal is produced if the detected ambient light level is above a threshold value. Either or both light beams are, as desired, generated or modified responsive to the output signal. The electrical signal may be processed to obtain information represented by the indicia. It may also be desirable for the light beams to be generated responsive to the electrical signal. Processing typically includes converting the analog electrical signal into a corresponding digital signal and decoding the digital signal. The processing can, if desired, include discriminating between indicia of different symbology types.

In a third method according to the present invention, a visible light beam, preferably a laser light beam, is generated and directed such that it forms a scan line across said indicia. The indicia is sensed, preferably using an imaging technique, so as to sense a reflection of light from the indicia. The detected light may be, for example, reflected ambient light or visible light from the light beam. The sensing may include detecting light reflected from a portion of the indicia which is in the form of a bull's eye mark. One or more electrical signals representing the reflection of the light from the indicia is generated. If multiple electrical signals are generated, it may be desirable to process these signals to produce a single output signal. It may also be beneficial to focus, automatically, the light reflected from the indicia prior to sensing. This method is particularly suitable for reading indicia within a range of approximately four to ten inches from the scanning device. Preferably, signals corresponding to the electrical or output signal are transmitted by a wireless transmitter or transceiver to a remote receiver or transceiver.

According to other aspects of the third inventive method, ambient light levels in a field of view are detected and an output signal generated if the detected ambient light is above a threshold value. The light beam is generated in response to the output signal. The electrical signal is typically processed. Processing can include converting the analog electrical signal to a corresponding digital signal, and decoding the digital signal to obtain optically encoded information represented by the indicia. The decoding may include discriminating between indicia of different symbology types, for example, a bar code and a matrix array of geometric shapes, such as a UPSCODE(TM) . It may also be beneficial to generate the light beam responsive to the electrical signal so that activation occurs only when necessary and appropriate for obtaining a read.

In accordance with further aspects of the third method of the invention, the reflection off one portion of the indicia of light from the visible light beam is photodetected while reflection off another portion of the indicia of either ambient light or light from the light beam is sensed. This method is particularly beneficial for use with indicia which include two symbols, for example a bar code and a matrix array symbol, disposed adjacent or in close proximity to each other.

According to still other aspects of the third method of the present invention, the scanner or reader operates in two distinct modalities, one for reading symbols of one symbology type or category, such as bar code symbols and the other reading symbols of a different symbology type or category, such as matrix codes. The scanner determines if the symbol being targeted is of one of the predetermined category or symbology types. A signal is generated which indicates the category of the targeted symbol and the modality is selected in response to the generated signal to subsequently read a symbol. Either of the two, or more, modalities can be selected in response to the generated signal. In one modality a charge coupled device may read matrix codes by imaging and in the other modality bar codes, such as stacked bar codes or adjacent rows of linear bar codes, may be read using light from a flying spot light beam or laser line reflected off the symbol or indicia.

According to still further aspects of this third method, range finding is performed. Range finding is accomplished by sensing the change in an image produced by the visible light beam while increasing or decreasing of the separation distance between the indicia and the scanning device. An electrical signal can then be generated which is indicative of the separation distance.

BRIEF DESCRIPTION OF THE DRAWINGS

FIGS. 1A–1E are respectively (1) a side sectional view of a gun-shaped, narrow-bodied, twin-windowed embodiment of a laser tube-based portable laser scanning head, (ii) a top sectional view of a detail of the laser tube and part of the optical train of FIG. 1A, (iii) a rear sectional view as taken along line IC—IC of FIG. 1A, (iv) a top plan section view showing the laser tube and part of the optical train, and (v) a front elevative view of the FIG. 1A embodiment, in accordance with this invention.

FIG. 2 is a front perspective view of the FIG. 1 embodiment, on a much smaller scale, and diagrammatically shows the interconnection of the head to the remainder of the scanning system.

FIG. 3 is a side schematic view of a gun-shaped, narrow-bodied, twin-windowed embodiment of a light-based portable scanning head in accordance with this invention.

FIG. 4 is a top plan schematic view of the embodiment of FIG. 3.

FIGS. 15A–15C are perspective views of a further embodiment of a hybrid scanner according to the present invention.

DETAILED DESCRIPTION OF THE PREFERRED EMBODIMENTS

Figure 1B:
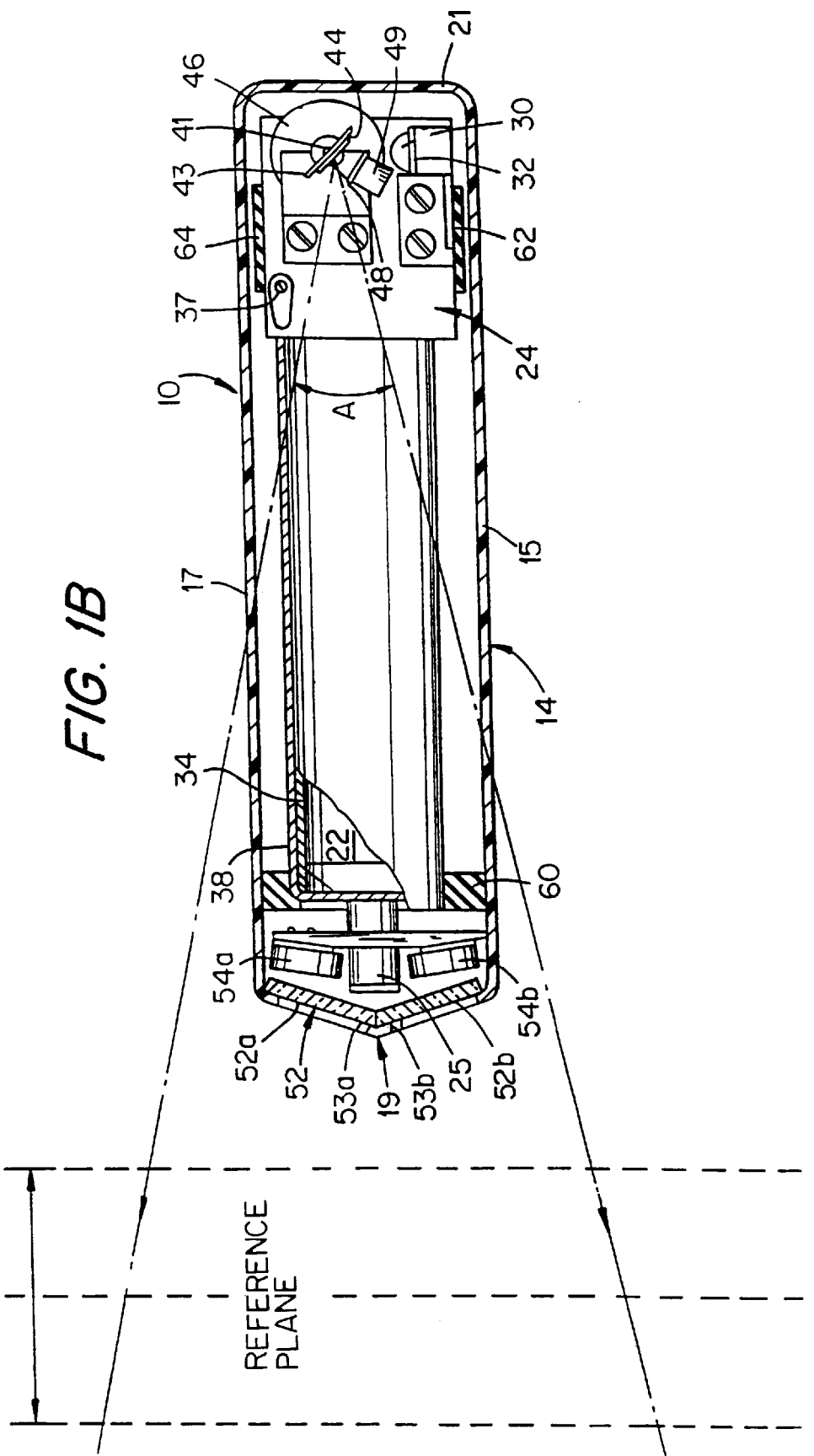

FIGS. 1–4 of the drawings refer to the embodiment set forth in parent application U.S. Ser. No. 08/093,967, filed Jul. 21, 1993, and the related applications set forth above under the Reference to Related Applications. Reference numeral 10 generally identifies a light-weight, narrow-bodied, streamlined, narrow-snouted, hand-held, fully portable, easy-to-manipulate, non-arm-and-wrist-fatiguing, twin-windowed laser scanning head supportable entirely by a user for use in an optical scanning system operative for reading, scanning and/or analyzing optically encoded symbols or other indicia. Such symbols may, for example, comprise a series of lines and spaces of varying widths or any array of geometric shapes, which pattern decodes to a multiple-digit representation characteristic of the product bearing the symbol.

The head 10 includes a generally gun-shaped housing having a handle portion 12 and an elongated narrow-bodied barrel or body portion 14. The handle portion 12 has a cross-sectional dimension and overall size such that it can conveniently fit in the palm of a user's hand. Both the body and handle portions are constituted of a light-weight, resilient, shock-resistant, self-supporting material, such as a synthetic plastic material. The plastic housing is preferably injection-molded, but can be vacuum-formed or blow-molded to form a thin shell which is hollow and bounds an interior space whose volume measures less than a value which is on the order of 50 cubic inches. The specific value of 50 cubic inches is not intended to be self-limiting, but has been provided merely to give an approximation of the overall maximum volume and size of the head 10. The overall volume can be less than 50 cubic inches and, indeed, in some applications, the volume is on the order of 25 cubic inches.

The body portion 14 is generally horizontally elongated along a longitudinal axis, and has a front region 16 at the front end, a raised rear region 18 at the rear end, and an intermediate body region 20 extending between the front and rear regions. The body portion 14 has a top wall 11 above which the raised rear region 18 projects, a bottom wall 13 below the top wall, a pair of opposed side walls 15, 17 spaced transversely apart of each other by a predetermined width dimension, a front wall or nose 19, and a rear wall 21 spaced rearwardly of the front wall.

A light source means, i.e., laser tube 22 having an anode or output end 28 and a cathode or non-output end 25, is mounted within the body portion 14 lengthwise along the longitudinal axis, and is operative for generating an incident collimated laser beam. An optic means, i.e., an optic train, is likewise mounted within the body portion, and is operative for directing the incident beam along a light path towards a reference plane located exteriorly of the housing in the vicinity of the front region 16, as shown in FIGS. 3 and 4. A symbol to be read is located in the vicinity of the reference plane, that is, anywhere within the depth of focus of the incident beam as described below, and the light reflected from the symbol constitutes reflected light from the laser beam which is directed along a light path away from the reference plane and back towards the housing.

As best shown in FIG. 1D the optic train includes an optical bench 24, a negative or concave lens 26 which is fixedly mounted in a cylindrical bore 25 of the bench, a light-reflecting mirror 26' which is fixedly mounted on an inclined surface 29 of the bench, a positive or convex lens 30 which is adjustably mounted on the bench by means of a set screw 31, and still another light-reflecting mirror 32 which is adjustably mounted on a bendable metal bracket 33.

The optical bench 24 has an enlarged cylindrical recess 35 which communicates with the smaller bore 25. The laser tube 22 is snugly received in a cylindrical support sleeve 34 which, in turn, is snugly received in the bore 25. An electrically conductive element or washer 36 is located at the shoulder between the recess 35 and bore 25. The washer 36 makes an electromechanical, non-soldered contact with the output end 23 of the tube. Another electrically conductive element, preferably a resilient wire 38, is mounted at the non-output end 25 of the tube. The wire 38 has one coiled end looped around the non-output end 25, an intermediate taut wire portion extending lengthwise of the tube, and its other end is fixedly secured to the bench 24 by the set screw 37. The wire 38 is preferably made of resilient, spring-like material, and its tautness functions much like a spring or biasing means for affirmatively urging the output end 23 into affirmative, electromechanical contact with the washer 36. The non-output end 25 is grounded via the wire 38; and a high voltage power wire (not shown) from the power supply component 40 mounted in the handle portion 12 is electrically connected to a ballast resistor 42 mounted in another bore formed in the bench 24. The ballast resistor is, in turn, electrically connected to the washer 36 by a wire, not illustrated for the sake of clarity. It will be noted that neither the output nor non-output end of the tube is directly soldered to any electrical wire, a feature which is highly desirable in effecting on-site tube replacement. The bore 25 and recess 35 are mechanically bore-sighted so that the laser output beam is automatically optically aligned with the optic train when the sleeve-supported tube and output end are fully inserted into the recess 35 and bore 25, respectively.

The bench 24 is a one-piece light-weight part machined or preferably molded by inexpensive mass-production techniques of a dimensionally stable, flame-retardant material, such as Delrin (Trademark), or glass-filled Noryl (Trademark), preferably having a high dielectric breakdown (on the order of 500 volts/mil). In order to take into account the slight variations in beam alignment which unavoidably result from different tubes and from tolerance variations in the tube itself, the bore 25, and the recess 35, the very weak negative lens 26 (on the order of—24 mm) is mounted very close to the output end of the tube, and all the elements in the optical path are made large enough to allow the beam to pass unobstructedly even if the beam is not exactly on center. The close mounting of the weak lens 26, and the short optical path (about 38 mm) between lenses 26 and 30, mean that the optical tolerances in the remainder of the beam path can still be off by about ½ without sacrificing system performance. This provides the advantage that the bench can be inexpensively mass-produced with practical tolerances.

Thus the beam emitted from the output end 23 first passes through the negative lens 26 which functions to diverge the initially collimated beam. Then, the divergent beam impinges the mirror 26, and is thereupon reflected laterally to impinge the mirror 28, whereupon the beam is reflected upwardly to pass through the positive lens 30 which is operative to converge the divergent beam to a generally circular spot of approximately an 8 mil to 10 mil diameter at the reference plane. The spot size remains approximately constant throughout the depth of focus at either side of the reference plane. The converging beam from the lens 30 impinges on the adjustable mirror 32, and is thereupon laterally reflected to a scanning mirror 44 which forms part of the scanning means.

The scanning means is preferably a high-speed scanner motor 46 of the type shown and described in copending U.S. application Ser. No. 125,768, filed Feb. 29, 1980, entitled "Portable Laser Scanning System and Scanning Methods," and assigned to the same assignee as the present application. The entire contents of this application, now U.S. Pat. No. 4,387,297, are incorporated herein by reference and made part of this application. For purposes of this patent, it is sufficient to point out that the scanner motor 46 has an output shaft 41 on which a support plate 43 is fixedly mounted. The scanning mirror 44 is fixedly mounted on the plate 43. The motor 46 is driven to reciprocally and repetitively oscillate the shaft in alternate circumferential directions over arc lengths of any desired size, typically less than 360°, and at a rate of speed on the order of a plurality of oscillations per second. In a preferred embodiment of this invention, the scanning mirror 44 and the shaft are jointly oscillated so that the scanning mirror repetitively sweeps the beam impinging thereon through an angular distance A or an arc length of about 25 degrees and at a rate of about 40 oscillations per second.

Stop means, i.e., an abutment 48, is fixedly mounted on a bracket 49 which is, in turn, mounted on the bench 24. The abutment 48 is located in the path of oscillating movement of the plate 43 supporting the scanning mirror 44, for preventing the mirror from making a complete 360 rotation during shipping. The abutment never strikes the mirror during scanning; the abutment serves to keep the mirror properly aligned, that is, always facing towards the front of the head.

The scanning motor 46 is mounted on the bench 24 slightly offset from the longitudinal axis. Other miniature scanning elements can be utilized. For example, miniature polygons driven by motors can be used, or the various bimorph scanning oscillating elements described in U.S. Pat. No. 4,251,798 can be used, or the penta-bimorph element described in the aforementioned co-pending application can be used, or the miniature polygon element described in co-pending U.S. Pat. application Ser. No. 133,945, filed Mar. 25, 1980, entitled "Portable Stand-Alone Desk-Top Laser Scanning Workstation for Intelligent Data Acquisition Terminal and Method of Scanning," and assigned to the same assignee as the present application, the entire contents of which are hereby incorporated herein by reference and made part of this disclosure, can be used.

Although only a single scanner element is shown in the drawings for cyclically sweeping the laser beam across the symbol along a predetermined direction (X-axis scanning) lengthwise thereof, it will be understood that another scanner element may be mounted in the head for sweeping the symbol along a transverse direction (Y-axis scanning) which is substantially orthogonal to the predetermined direction. In some applications, multiple line scanning is preferred. Other alternative configurations could be used to provide both x and y BX13 scanning with a single scanner element. Using x and y scanning a raster, omni-directional or other scan pattern can, as desired, be formed.

Referring again to FIGS. 1–2, the scanning mirror 44 is mounted in the light path of the incident beam at the rear region of the head, and the motor 46 is operative for cyclically sweeping the incident beam through an angular distance A over a field of view across the symbol located in the vicinity of the reference planes. A laser light-transmissive scan window 50 is mounted on the raised rear region 18, behind an opening 51 formed therein in close adjacent confronting relationship with the scanning mirror 44 thereat. As used throughout the specification and claims herein, the term "close adjacent confronting" relationship between components is defined to mean that one component is proximally located relative to the other component, typically less than one inch apart of each other. As shown in FIG. 1A, the scan window 50 is configured and positioned in the light path of the incident beam to permit the latter coming from the scanning mirror 44 to travel a distance of less than one inch within the raised rear region 18, and then to pass through the scan window 50, and thereupon to travel unobstructedly and exteriorly of and past the intermediate body region 20 and the front region 16 of the housing, and then to impinge on the symbol located at or near the reference plane.

The closer the scanning mirror 44 is to the scan window 50, the larger will be the field of view of the swept incident beam for a given scan angle. It will be noted that the width dimension of the scan window represents a limiting factor for the sweep of the incident beam, because the housing walls bounding the scan window would clip and block any beam which was swept beyond the width of the scan window. Hence, as a rule, the scanning mirror is made as close as possible to the scan window to optimize the field of view of the swept incident beam.

As best shown in FIG. 2, the field of view of the swept incident beam is substantially independent of the width of the body portion 14 and, in fact, the field of view, i.e., the transverse beam dimension, of the swept incident beam is actually larger than the width of the body portion 14 at the front region 16 and at the forward section of the intermediate body region 20. This is, of course, due to the fact that the swept incident beam has been transmitted outside of the front and intermediate body regions of the housing. The side walls 15, 17 are not in the light path and do not clip or block the swept incident beam. The scan window 50 is mounted on the rear region 18 at an elevation above the top wall 11 to permit an overhead unobstructed transmission.

In a preferred embodiment, the width of the body portion 14 is on the order of 1¾ inches, whereas the field of view at the reference plane is on the order of 3½ inches. In prior art wide-bodied designs, the width of the housing was greater than 3½ inches in order to obtain a 3½ inch field of view for a given scan angle. Hence, the exterior transmission of the swept incident beam permits the head of the present invention to have a narrow-bodied streamlined configurations. The side walls 15, 17 need no longer diverge outwardly towards the front as in prior art designs to accommodate the swept beam, but can be made substantially parallel as shown, or in any other desired shape.

In a preferred embodiment, the reference plane is located about 2 inches from the front wall 19 of the head, and is located a linear distance of about 9½ inches from the positive lens 30. The depth of field at the reference plane is about 2¾ on either side of the reference plane. These numerical figures are not intended to be self-limiting, but are merely exemplary. A laser light-transmissive non-scan window 52 is mounted on the front wall 19 in close adjacent confronting relationship with the sensor means 54 located the front region 16. The sensor means 54 is operative for detecting the intensity of the light in the reflected beam coming from the symbol over a field of view across the same, and for generating an electrical analog signal indicative of the detected light intensity. In order to increase the zone of coverage of the sensor means, a pair of sensor elements or photodiodes 54a, 54b are located on opposite sides of the longitudinal axis. The sensor elements lie in intersecting planes and face both forwardly and laterally. The front wall 19 is likewise constituted of a pair of tapered wall portions 19a, 19b, each of which has an opening 53a, 53b formed therein. A pair of non-scan window portions 52a, 52b is fixedly mounted behind the openings 52a, 52b, respectively. Each non-scan window portion is mounted in close adjacent confronting relationship with its respective sensor element. The non-scan window portions are configured and positioned in the light path of the reflected beam to permit the latter to pass therethrough to the sensor elements. Two small non-scan window portions are preferably utilized, rather than a single non-scan window, because two smaller windows are inherently stronger than one due to the greater perimeter that two windows provide.

The scan window 50 is located rearwardly of the non-scan window 52. Each window 50, 52 is located at a different distance from the reference plane and the front wall 19. The scan window 50 is elevated above the non-scan window 52, as described above. The non-scan window portions are located at opposite sides of the longitudinal axis. The scan window is located on the longitudinal axis.

A printed circuit board 59 is mounted within the body portion 14, and various electrical sub-circuits diagrammatically represented by reference numerals 55, 56, 57, 58 are provided on the board 59. Signal processing means 55 is operative to process the analog signal generated by the sensor elements to a digitized signal to generate therefrom data descriptive of the symbol. Suitable signal processing means for this purpose was described in U.S. Pat. No. 4,251,798. Sub-circuit 56 constitutes drive circuitry for the scanner motor 46. Suitable motor drive circuitry for this purpose was described in the aforementioned co-pending application Ser. No. 125,768. Sub-circuits 57 and 58 constitute a safety circuit for the laser tube, and voltage regulator circuitry. Suitable circuitry for this purpose were also described in co-pending application Ser. No. 125,768.

Shock mounting means are mounted at the front end rear regions of the body portion, for shock mounting the laser, optical and scanning components within the body portion. An annular shock collar 60, preferably of rubber material, surrounds the forward end of the tube 22 and engages the bottom wall 13 and the underside of the circuit board 59. Board support elements 61a, 61b extend downwardly of the top wall 11 to rigidly support the circuit board 59. A pair of rubber shock mounts 62 are fixedly mounted on opposite sides of the optical bench 24, and respectively engage the side walls 15, 17 at the rear region 18 of the housing. The shock mounts 62 and the collar 60 are spaced longitudinally apart of each other and engage the thin-walled housing at three spaced locations to isolate twisting of the housing from the laser optical and scanning components.

Electrical power is supplied to the laser tube 22 by the power supply component 40 mounted within the handle portion 12. The power supply component which steps up from a 12 volt DC battery voltage to over 1 kilovolt is the heaviest component in the head, and its mounting in the handle portion allows for a low center of gravity and for better balance of the head.

A non-bulky, collapsible, coil-type cable 66 as shown in FIG. 2, electrically connects the head 10 to the remainder of the scanning system, which includes a battery-powered decode module 68 and a host computer 70. The coil-type cable 66 is readily flexible and permits user manipulation of the head 10 with multiple freedoms of movement from one symbol to the next without requiring excessive strength by the user. The cable 66 includes a plurality of conductive wires which are all relatively thin and flexible. For example, one wire carries the 12 volt DC low voltage signal from the battery in the decode nodule 68 to the power component 40. Another wire carries the digitized signal from the analog-to-digital signal processing circuitry 55 to the decode module 68 for decoding purposes. This latter wire is non-radio-frequency-shielded, and hence, is readily flexible. The remaining wires carry low voltage control and communication signals. All of the wires of the cable 66 are connected together to a common plug-type connector 72. A mating connector 74 is mounted within the head, receives the connector 72 in a mating relationship. The use of the mating connectors 72, 74 permits rapid replacement of the cable for on-site repairs. The electrical connections between the connector 74 and the various components in the head have been omitted from the drawings for the sake of clarity.

The decode module 68 processes the digitized signal generated in the head, and calculates the desired data, e.g. the multiple digit representation or code of the symbol, in accordance with an algorithm contained in a software program. The decode module 68 includes a PROM for holding the control program, a RAM for temporary data storage, and a microprocessor which controls the PROM and RAM and does the desired calculations. The decode module also includes control circuitry for controlling the actuatable components in the head as described below, as well as two-way communications circuitry for communicating with the head and/or with the host computer 70. The host computer 70 is essentially a large data base, and provides information relating to the decoded symbol. For example, the host computer can provide retail price information corresponding to the decoded symbols.

A manually-actuatable trigger switch 76 is mounted on the head in the region where the handle portion 12 is joined to the body portion 14. Depression of the trigger switch 76 is operative to turn the microprocessor in the decode module on. Upon release of the trigger switch, the spring 78 restores the switch to its initial position, and the microprocessor is turned off. In turn, the microprocessor is electrically connected to the actuatable components in the head via the cable 66 to actuate and deactuate the actuatable components when the microprocessor is respectively turned on or off by the trigger switch.

In prior art heads, the trigger switch was only operative to turn the laser tube and/or scanner motor on or off. Now, the trigger switch turns the microprocessor on or off and, in turn, all of the actuatable components in the head on or off. The microprocessor is a large power drain on the battery built into the decode module. Hence, by controlling the on-time of the microprocessor to only those times when a symbol is being read, that is, when the trigger switch is depressed, the power drain is substantially reduced, and the battery life substantially increased (over 5 hours).

Another feature of this invention is embodied in turning the microprocessor on or off by means of the host computer 70 which is remote from the head 10. The computer 70 typically includes a keyboard and a display. Once a user makes an entry on the keyboard, for example, by entering the identity of the code to be decoded, the computer requests the microprocessor to turn itself on, store the information, and then to turn itself off. The microprocessor, again, is on only for so long as is necessary to comply with the computer request. The trigger switch and the keyboard computer entry are independently operable means for directly controlling the microprocessor, and for indirectly controlling the actuatable components in the head.

Another useful feature in having the microprocessor, rather than the trigger switch, directly control the laser tube is to keep an accurate record of laser on-time for governmental record keeping. It is, of course, far easier to keep track of laser on-time in the software of a microprocessor than to manually record the laser on-time. Using the microprocessor, the laser tube might be activated only after a satisfactory read of one symbol and until another symbol is properly read. Alternatively, the laser tube could remain activated until a predetermined period of time passes without a decode.

A set of visual indicators or lamps 80, 82, 84 is also mounted on the circuit board 59, each lamp being positioned below a corresponding opening in the top wall 11. The lamps are operative to visually indicate to the user the status of the scanning system. For example, lamp 80 illuminates whenever the laser tube is energized, thereby continuously advising the user whether the tube is on or off. Lamp 82 illuminates when a successful decode has been obtained. It will be recalled that the incident beam is swept over a symbol at a rate of about 40 scans per second. The reflected beam may be successfully decoded on the first scan, or on any of the successive scans. Whenever a successful scan has been obtained, the microprocessor will cause the lamp 84 to be illuminated to advise the user that the head is ready to read another symbol.

It is believed that the operation of the scanning system is self-evident from the foregoing, but by way of brief review, the gun-shaped head is grasped by its handle portion, and its barrel is aimed at the symbol to be read. The sighting of the symbol is facilitated by the fact that the barrel is narrow-bodied, and that there are no obstructions on the front and intermediate body regions of the barrel. The front wall of the barrel is situated close to the symbol, it being understood that the symbol can be located anywhere in the depth of field at either side of the reference plane.

The trigger switch is then depressed, thereby causing the microprocessor to energize the laser tube, the scanner motor, the sensor elements, and all the electronic circuitry provided on the printed circuit board. The laser tube emits a beam, which is then routed through the optic train as described above, and thereupon, the scanning mirror reflects the beam through the scan window and out of the head exteriorly of and past the front and intermediate body regions of the body portion of the head. The reflected beam light passes through the non-scan window portions to the sensor elements and is subsequently processed by the signal processing circuitry. The processed signal is conducted to the decode module for decoding. Once a successful decode has been realized, the microprocessor illuminates the lamp 82 and if desired may deactuate the head, and the user is now advised by illumination by lamp 84 that the head is ready to be aimed at another symbol. The flexibility of the coil-type cable facilitates the movement of the head to the next symbol.

In addition, the movement of the head from one symbol to the next is facilitated by the relatively low weight of the head. The head with all the aforementioned components therein weighs less than one pound. This represents a significant breakthrough in the art of miniaturized and portable laser scanning heads.

Referring now to FIGS. 3 and 4, reference numeral 130 generally identifies a gun-shaped, laserless, twin-windowed head analogous to the previous heads 10, 100, except as noted below. To simplify the description of head 130, like parts previously described in connection with the earlier embodiment have been identified with like reference numerals. One major distinction of the head 130 is that the incident beam is not swept, but is transmitted from the front of the housing, and that it is the reflected beam that is preferably swept over its field of view. Put another way, the sensor means preferably a linear array of charge coupled devices or a two-dimensional array of solid state imaging devices sweeps across the symbol. It will be understood, however, that if desired the sensor could be provided with the capability to operate in either or both scanning and non-scanning modes with the appropriate operation being selectable to the suitability for the particular function, e.g. reading, ambient light detection, range finding, to which the sensor is directed. When operating in a scanning mode, the sensor may scan the field of view at a rate which can be faster or substantially slower than the scanning light beam scan. The sensor may be controlled to scan the field of view periodically. It is the reflected beam that unobstructedly travels exteriorly of and past the front and intermediate body regions of the housing.

Rather than a laser tube or laser diode, the laserless head 130 comprises a light source 132 which includes a pair of light source elements 132a, 132b at opposite sides of the longitudinal axis, each light source element facing both forwardly, upwardly and laterally to emit a light beam. Again, the light source elements need not generate a laser beam but are operative to generate any type of light beam, and may constitute high-powered LED's (30–100 mW) or a miniature quartz halogen bulb. The incident light beam passes through a light transmissive front non-scan window 152 located at the front region 16 of the body portion 20 of the head in close adjacent confronting relationship with the light source elements 132a, 132b thereat. In a variant from non-scan window 52, the non-scan window 152 is a wraparound window which extends transversely along the front and also partially along the side walls of the head. After passing through the non-scan window 152, the incident beam illuminates the symbol. It is preferable if the incident beam is directed slightly upwardly, such that the reflected beam will be directed, as shown, that is, exteriorly of and past the front region 16 and intermediate body region 20 above the top wall of the body portion. The reflected beam passes through the raised rear scan window 150 and impinges on the scanning mirror 44 which is being repetitively oscillated by the scanner motor 46 to scan the field of view of the reflected beam across the symbol. The swept reflected beam is thereupon directed towards the light-reflecting mirror 134 which is adjustably mounted on a bendable mounting bracket 136 on a sensor optic tube 138. The mirror 134 is positioned in the light path of the reflected beam to direct the reflected light off the mirror 44 through the sensor optics tube 138 to the sensor means 140 mounted within the body portion 14 at the rear region 18 of the head.

As best shown in FIG. 4, the reflected light beam is swept over a transverse beam dimension which is larger the width of the body portion. Hence, here again, the field of view of the swept reflected beam is substantially independent of the barrel width.

Figure 5:
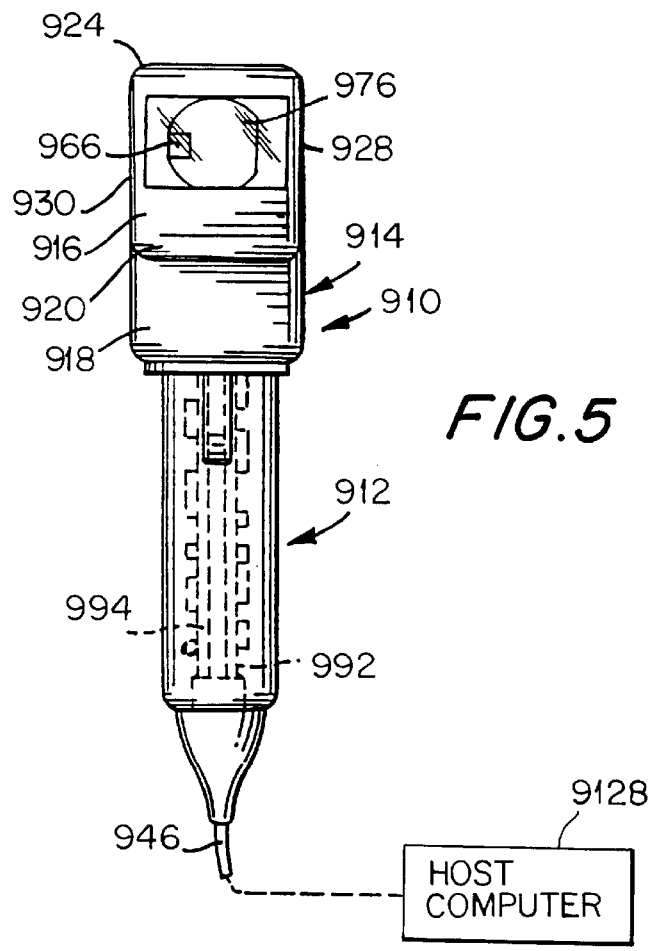
FIG. 5 is a front view of a portable laser diode scanning head in accordance with a second embodiment of this invention.
Figure 7:
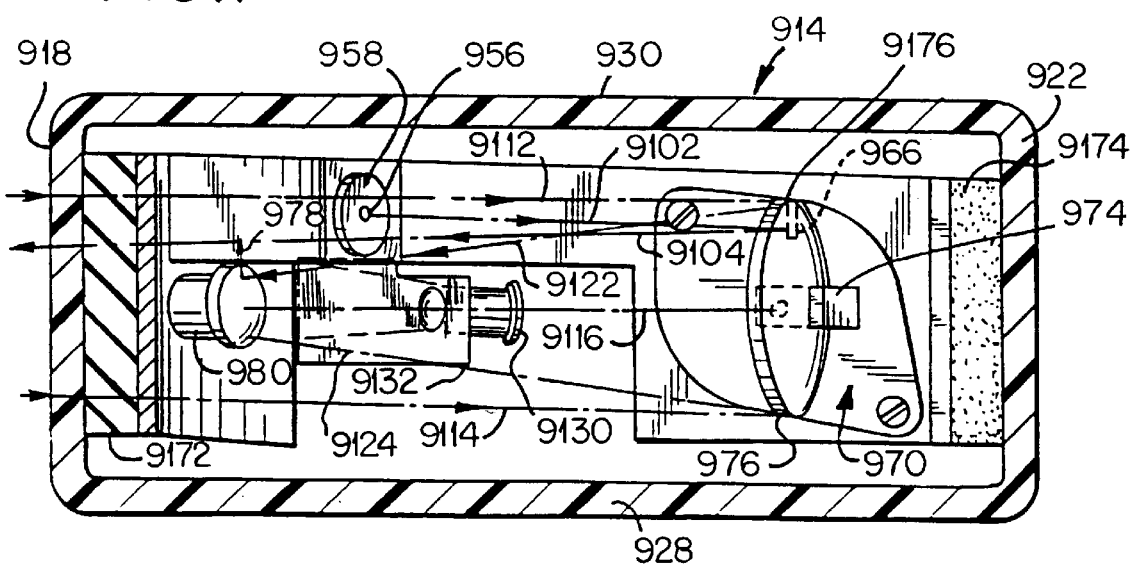
FIG. 7 is a sectional view taken on line 7—7 of FIG. 6.
Figure 6:
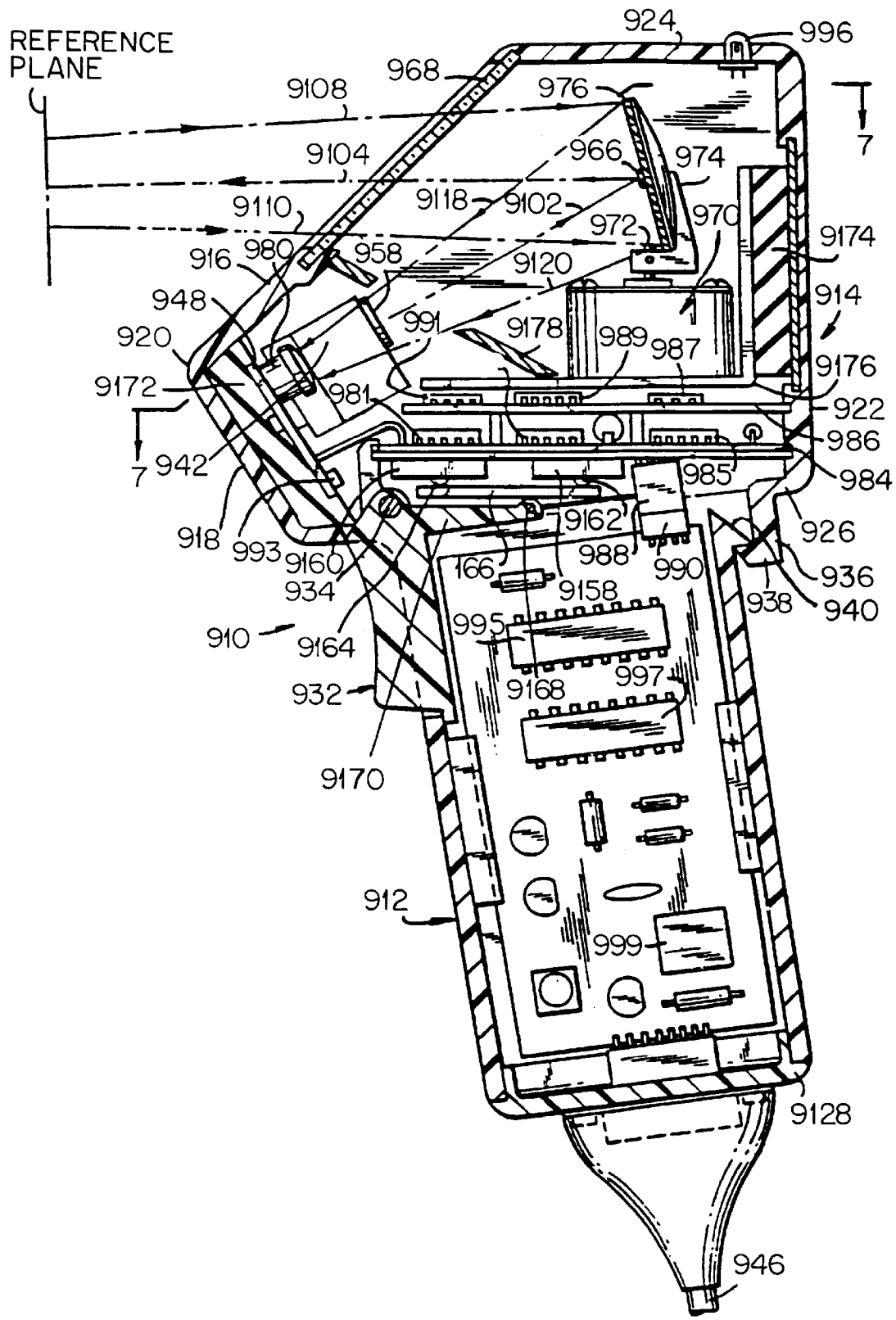
FIG. 6 is an enlarged cross-sectional view of the head of FIG 5.

FIGS. 5–7 of the drawings refer to the embodiment set forth in parent application U.S. Pat. Ser. No. 08/074,641, filed Jun. 11, 1993 and the related applications set forth above under the Reference to Related Applications. Reference numeral 910 generally identifies a lightweight (less than one pound), narrow-bodied, streamlined, narrow-snouted, hand-held, fully portable, easy-to-manipulate, non-arm-and-wrist fatiguing laser scanning system operative for reading, scanning and/or analyzing symbols, and amiable both prior to, and during, the reading thereof, by the user at the symbols, each symbol in its turn.

The head 910 includes a generally gun-shaped housing having a handle portion 912 of generally rectangular cross-section and generally vertically elongated along a handle axis, and a generally horizontally elongated, narrow-bodied barrel or body portion 914, The cross-sectional dimension and overall size of the handle portion 912 is such that conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 910.

As considered in an intended position of use as shown in FIGS. 5–7, the body portion 914 has a front prow region having an upper front wall 916 and a lower front wall 918 which forwardly converge toward each other and meet at a nose portion 920 which lies at the foremost part of the head. The body portion 914 also has a rear region having a rear wall 922 spaced rearwardly of the front walls 916, 918. The body portion 914 also has a top wall 924, a bottom wall 926 below the top wall 924, and a pair of opposed side walls 928, 930 that lie in mutual parallelism between the top and bottom walls.

A manually-actable, and preferably depressive, trigger 932 is mounted for pivoting movement about a pivot axis 934 on the head in a forwardly-facing region where the handle and body portions meet and where the user's forefinger normally lies when the user grips the handle portion in the intended position of use. The bottom wall 926 has a tubular neck portion 936 which extends downwardly along the handle axis, and terminates in a radially-inwardly extending collar portion 938 generally rectangular cross-section. The neck and collar portions have a forwardly-facing slot through which the trigger 932 projects and is moved.

The handle portion 912 has a radially-outwardly extending upper flange portion 940 of generally rectangular cross-section which also has a forwardly-facing slot through which the trigger 32 projects and is moved. The upper flange portion 940 is resilient and deflectable in a radially-inward direction. When the upper flange portion 940 is inserted into the neck portion 936, the upper flange portion 940 bears against the collar portion 938 and is radially-inwardly deflected until the flange portion 940 clears the collar portion 938, at which, the upper flange portion 940, due to its inherent resilience, snaps back to its initial undeflected position and engages behind the collar portion with a snap-type looking action. To disengage the handle portion from the body portion, the upper part of the handle portion is sufficiently deflected until the upper flange portion 940 again clears the collar portion, and thereupon the handle portion can be withdrawn from the neck portion 936. In this manner, handle portion 912 can be detachably snap-mounted and demounted from the body portion 914 and, as explained below, another handle portion from a set of interchangeable handle portions, each containing different components of the laser scanning system, may be mounted to the body portion to adapt the head 910 to different user requirements.

A plurality of components are mounted in the head and, as explained below, at least some of them are actuated by the trigger 932, either directly or indirectly, by means of a control microprocessor. One of the head components is an actuable laser light source, e.g. a semiconductor laser diode 942 operative, when actuated by the trigger 932, for propagating and generating an incident laser beam whose light, as explained above, is "invisible" or non-readily visible to the user, is highly divergent, is non-radially symmetrical, is generally oval in cross-section, and has a wavelength above 7000, e.g. about 7800 m Angstrom units. Advantageously, the diode 942 is commercially available from many sources, e.g. from the Sharp Corporation as its Model No. LT020MC. The diode may be of the continuous wave or pulse type. The diode 942 requires a low voltage, e.g. 12 v DC or less, supplied by a battery (DC) source which may be provided within the head, or by a rechargeable battery pack accessory detachably mounted on the head, or by a power conductor in a cable 946, see FIG. 5 connected to the head from an external power supply, e.g. DC source.

The aperture stop 956 is positioned in the center of the laser diode beam so that the intensity of light is approximately uniform in the planes both perpendicular and parallel to the p-n junction, i.e. the emitter, of the diode 942. It will be noted that, due to the non-radial symmetry of the laser diode beam, the light intensity in the plane perpendicular to the p-n junction is brightest in the center of the beam and then falls off in the radially outward direction. The same is true in the plane parallel to the p-n junction, but the intensity falls off at a different rate. Hence, by positioning a preferably circular, small aperture in the center of a laser diode beam having an oval, larger cross-section, the oval beam cross-section at the aperture will be modified to one that is generally circular, and the light intensity in both of the planes perpendicular and parallel to the p-n junction approximately is constant. The aperture stop preferably reduces the numerical aperture of the optical assembly to below 0.05, and permits the single lens 958 to focus the laser beam at the reference plane.

In a preferred embodiment, the approximate distance between the emitter of the laser diode 942 and the aperture stop 956 ranges from about 9.7 mm. The focal distance of the lens 958 ranges from about 9.5 mm to about 9.7 mm. If the aperture stop 956 is circular, then its diameter is about 1.2 mm. It the aperture stop 956 is rectangular, then its dimensions are about 1 mm by about 2 mm. The beam cross-section is about 3.0 mm by about 9.3 mm just before the beam passes through the aperture stop 956. These merely exemplary distances and sizes enable the optical assembly to modify the laser diode.

Figure 8:
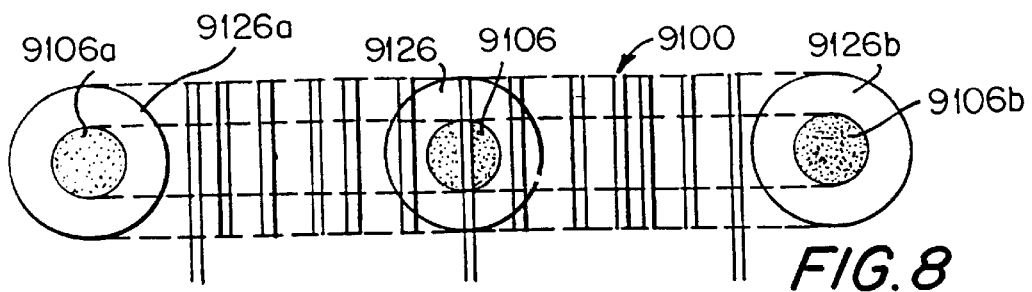
FIG. 8 is an enlarged view of a symbol and the parts thereof which are impinged upon, and reflected from, by a light beam.

As best shown in FIG. 8, a representative symbol 9100 in the vicinity of the reference plane is shown and, in the case of a bar code symbol, is comprised of a series of vertical bars spaced apart of one another along a longitudinal direction. The reference numeral 9106 denotes the generally circular, invisible, laser spot subtended by the symbol. The laser spot 9106 in FIG. 8 is shown in an instantaneous position, since the scanning mirror 966, when actuated by the trigger 32, is, as explained below, reciprocally and repetitively oscillated transversely to sweep the incident laser beam lengthwise across all the bars of the symbol in a linear scan. The laser spots 9106a and 9106b in FIG. 8 denote the instantaneous end positions of the linear scan. The linear scan can be located anywhere along the height of the bars provided that all the bars are swept. The length of the linear scan is longer than the length of the longest symbol expected to be read and, in a preferred case, the linear scan is on the order of 5 inches at the reference plane.

The scanning mirror 966 is mounted on a scanning means, preferably a high-speed scanner motor 970 of the type shown and described in U.S. Pat. No. 4,387,397, the entire contents of said patent being incorporated herein by reference and made part of the instant application. For the purposes of this application, it is believed to be sufficient to point out that the scanner motor 970 has an output shaft 972 on which a support bracket 974 is fixedly mounted. The scanning mirror 966 is fixedly mounted on the bracket 974. The motor 970 is driven to reciprocally and repetitively oscillate the shaft 972 in alternate circumferential directions over arc lengths of any desired size, typically less than 360 degrees, and at a rate of speed on the order of a plurality of oscillations per second. In a preferred embodiment, the scanning mirror 966 and the shaft 972 jointly are oscillated so that the scanning mirror 966 repetitively sweeps the incident laser diode beam impinging thereon through an angular distance or arc length at the reference plane of about 32 degrees and at a rate of about 40 scans or 20 oscillations per second.

Referring again to FIG. 6, the returning portion of the reflected laser light has a variable light intensity, due to the different light-reflective properties of the various parts that comprise the symbol 9100, over the symbol during the scan. The returning portion of the reflected laser light is collected by a generally concave, spherical collecting mirror 976, and is a broad conical stream of light in a conical collecting volume bounded, as shown in FIG. 6, by upper and lower boundary lines 9108, 9110, and, as shown in FIG. 7, by opposed size boundary lines 9112, 9114. The collecting mirror 976 reflects the collected conical light into the head along an optical axis 9116 as shown in FIG. 7, along the second optical path through a laser-light-transmissive element 978 to a sensor means, e.g. a photosensor 980. The collected conical laser light directed to the photosensor 980 is bounded by upper and lower boundary lines 9118, 9120 as shown in FIG. 6 and by opposed side boundary lines 9122, 9124, as shown FIG. 7. The photosensor 980, preferably a linear charge coupled or two-dimensional solid state imaging device or could have a photodiode, detects by sensing or imaging the variable intensity of the collected laser light over a field of view which extends along, and preferably beyond, the linear scan, and generates an electrical analog signal indicative of the detected variable light intensity. The linear charge coupled device is arranged within the scanner housing so that the long dimension of the charge coupled device will be parallel to the scanning light beam.

Referring again to FIG. 8, the reference numeral 9126 denotes an instantaneous collection zone subtended by the symbol 9100 and from which the instantaneous laser spot 9106 reflects. Put another way, the photosensor 980 "sees" the collection zone 9126 when the laser spot 9106 impinges the symbol. The collecting mirror 976 is mounted on the support bracket 974 and, when the scanner motor 970 is actuated by the trigger 932, the collecting mirror 976 is reciprocally and repetitively oscillated transversely, sweeping the field of view of the photodiode lengthwise across the symbol in a linear scan. The collection zones 9126a, 9126b denote the instantaneous end positions of the linear scan of the field of view.

The scanning mirror 966 and the collecting mirror 976 are, in a preferred embodiment, of one-piece construction and, as shown in FIG. 7, are light-reflecting layers or coatings applied to a pleno-convex lens constituted of a light-transmissive material, preferably glass. The lens has a first outer substantially planar surface on a portion of which a first light-reflecting layer is coated to constitute the planar scanning mirror 966, and a second outer generally spherical surface on which a second light-reflecting layer is coated to constitute the concave collecting mirror 976 as a so-called "second surface spherical mirror."

The scanning mirror 966 can also be a discrete, small planar mirror attached by glue, or molded in place, at the correct position and angle on a discrete, front surfaced, silvered concave mirror. As described below, the concave collecting mirror 976 serves not only to collect the returning portion of the laser light and to focus the same on the photodiode 980, but also to focus and direct an aiming light beam exteriorly of the head.

Also mounted in the head is a pair or more of printed circuit boards 984, 986 on which various electrical subcircuits are mounted. For example, signal processing means having components 983 and 985 on board 984 are operative for processing the analog electrical signal generated by the sensor 980, and for generating a digitized video signal. Data descriptive of the symbol can be derived from the video signal. Suitable signal processing means for this purpose was described in U.S. Pat. No. 4,251,798. Components 987 and 989 on board 986 constitute drive circuitry for the scanner motor 970, and suitable motor drive circuitry for this purpose was described in U.S. Pat. No. 4,387,297. Component 991 on board 986 constitutes an aiming light controller subcircuit whose operation is described below. Component 993 on board 948, on which the diode 942 and sensor 980 are mounted, is a voltage converter for converting the incoming voltage to one suitable for energizing the laser diode 942. The entire contents of U.S. Pat. Nos. 4,251,798 and 4,387,297 are incorporated herein by reference and made part of the instant application.

The digitized video signal is conducted to an electrical interlock composed of a socket 988 provided on the body portion 914, and a mating plug 990 provided on the handle portion 912. The plug 990 automatically electromechanically mates with the socket 988 when the handle portion is mounted to the body portion. Also mounted within the handle portion are a pair of circuit boards 992, 994, as shown FIG. 5 on which various components are mounted. For example, a decode/control means comprised of components 995, 997 and others are operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger 932. The decode/control means also includes control circuitry for controlling the actuation of the actuatable components in the head, as initiated by the trigger, as well as for communicating with the user that the reading has been automatically determined as, for example, by sending a control signal to an indicator lamp 996 to illuminate the same.

The decoded signal is conducted, in one embodiment, along a signal conductor in the cable 946 to a remote, host computer 9128 which serves essentially as a large data base, stores the decoded signal and, in some cases, provides information related to the decoded signal. For example, the host computer can provide retail price information corresponding to the objects identified by their decoded symbols.

In another embodiment, a local data storage means, e.g. component 995, is mounted in the handle portion, and stores multiple decoded signals which have been read. The stored decoded signals thereupon can be unloaded to a remote host computer. By providing the local data storage means, the use of the cable 946 during the reading of the symbols can be eliminated—a feature which is very desirable in making the head as freely manipulatable as possible.

As noted previously, the handle portion 912 may be one of a set of handles which may be interchangeably mounted to the body portion. In one embodiment, the handle portion may be left vacant, in which case, the video signal is conducted along the cable 946 for decoding in a remote decode/control means. In another embodiment, only the decode/control means may be contained within the handle portion, in which case, the decoded signal is conducted along the cable 946 for storage in a remote host computer. In still another embodiment, the decode/control means and a local data storage means may be contained within the handle portion, in which case, the stored decoded signals from a plurality of readings thereupon may be unloaded in a remote host computer, the cable 946 only being connected to unload the stored signal.

Alternatively, rather than providing a set of removable handles, a single handle can be non-detachably fixed to the head and, in this event, different components mounted on removable circuit boards 992 and 994 may be provided, as desired, within the single handle by removing, and thereupon replacing, the removable handle end 9128.

As for electrically powering the laser diode 942, as well as the various components in the head requiring electrical power, a voltage signal may be conveyed along a power conductor in the cable 946, and a converter, such as component 993, may be employed to convert the incoming voltage signal to whatever voltage values are required. In those embodiments in which the cable 946 was eliminated during the reading of the symbols, a rechargeable battery pack assembly is detachably snap-mounted at the bottom of the handle portion 912.

Figure 9:
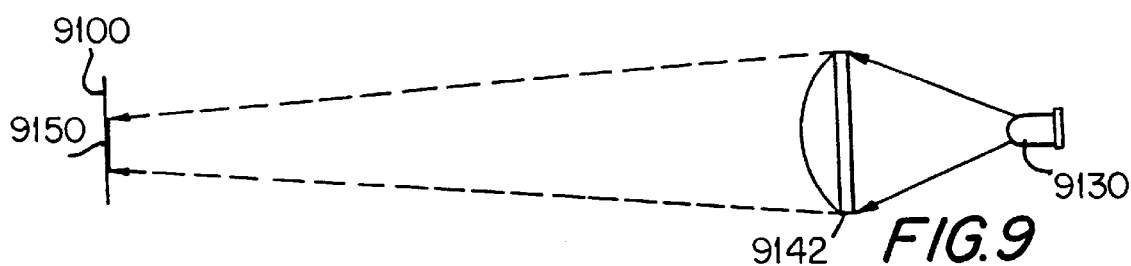
FIG. 9 is a schematic view of a static single beam aiming arrangement.

In further accordance with this invention and as shown in FIG. 9, an aiming light arrangement is mounted within the head for assisting the user in visually locating, and in aiming the head at, each symbol to be read in its turn, particularly in the situation described above wherein the laser beam incident on, and reflected from, the symbol is not readily visible to the user. The aiming light arrangement comprises means including an actuatable aiming light source 9130, e.g. a visible light-emitting diode (LED), an incandescent white light source, a xenon flash tube, etc., mounted in the head and operatively connected to the trigger 932. When actuated either directly by the trigger 932 or indirectly by the decode/control means, the aiming light 9130 propagates and generates a divergent aiming light beam whose light is readily visible to the user, and whose wavelength is about 6600 Angstrom units, so that the aiming light beam generally is red in color and thus contrasts with the ambient white light of the environment in which the symbol is located.

Aiming means also are mounted in the head for directing the aiming light beam along an aiming light path from the aiming light source toward the reference plane and to each symbol, visibly illuminating at least a part of the respective symbol. More specifically, as shown in FIG. 7, the aiming light 9130 is mounted on an inclined support 9132 for directing the generally conical aiming light beam at the optical element 978. The conical aiming light beam is bounded by upper and lower boundary lines and by opposed side boundary lines in route to the optical element 978. As previously noted, the optical element 978 permits the collected laser light to pass therethrough to the photosensor 980, and filters out ambient light noise from the environment from reaching the photosensor. The optical element 978 also reflects the aiming light beam impinging thereon. The optical element is, in effect, a so-called "cold" mirror which reflects light in wavelengths in the range of the aiming light beam, but transmits light in wavelengths in the range of the laser light. The aiming light beam is reflected from the cold mirror 978 along an optical axis which is substantially collinear with the optical axis 9116 of the collected laser light between the collecting mirror 976 and the photosensor 980, and impinges on the concave mirror 976 which serves to focus and forwardly reflect the aiming light beam along an optical axis which is substantially collinear with the same optical axis of the collected laser light between the concave mirror 976 and the symbol 9100. The concave mirror 976 which serves as a focusing mirror for the aiming light beam focuses the same to about a one-half inch circular spot size at a distance about 8 inches to about 10 inches from the nose 20 of the head. It will be noted that the portion of the aiming light path which lies exteriorly of the head coincides with the portion of the collected laser light path which lies exteriorly of the head so that the photosensor 980, in effect, "sees" the non-readily-visible laser light reflected from that part of the symbol that has been illuminated, or rendered visible, by the aiming light beam. In another variant, the aiming light beam could have been directed to the symbol so as to be coincident with the outgoing incident laser beam by placing a cold mirror in the first optical path and directing the aiming light beam at the cold mirror so that the optical axis of the aiming light beam is coincident with that of the outgoing incident laser beam.

As shown in FIG. 9, the aiming LED 9130 may, in a first static single beam aiming embodiment, be positioned relative to a stationary directing element 9142, e.g. a focusing lens, stationarily mounted in the aiming light path within the head. The lens 9142 is operative for focusing and directing the aiming light beam to the respective symbol 9100, visibly illuminating thereon a spot region 9150, see also FIG. 10, within the field of view. The spot region 9150 preferably is circular, near the center of the symbol, and is illuminated both prior to the scan to locate the symbol before the reading thereof, and during the scan and the reading thereof. Both close-in and far-out symbols can be located and: seen by the static single beam aiming embodiment of FIG. 9, the far-out symbols, due to their greater distance from the head, being illuminated to a lesser intensity, but visible, nevertheless, by the user. However, as explained previously, the fixed spot 9150 provides little assistance in terms of tracking the scan across the symbol.

Figure 10:
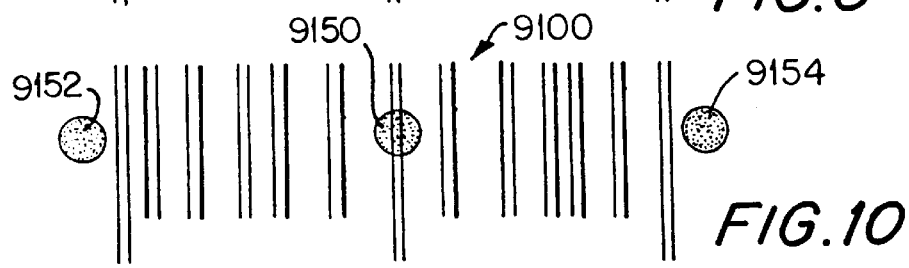
FIG. 10 is an enlarged view of a symbol and the parts thereof which are illuminated by static single-beam, or by twin-beam aiming.
Figure 11:
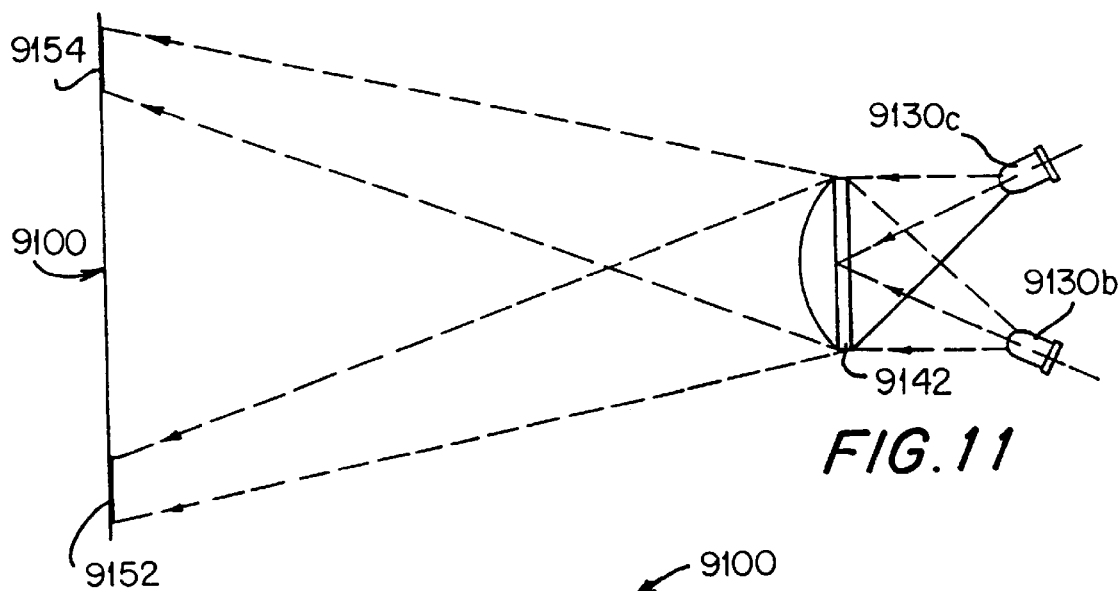
FIG. 11 is a schematic view of a static twin-beam aiming arrangement.

Turning next to a second static twin beam aiming embodiment, as shown in FIG. 11, a pair of aiming LEDs 9130a, 9130b, each identical to aiming LED 9130, are angularly positioned relative to the stationary focusing lens 9142 which, in turn, is operative to direct the aiming light beams of both LEDs 9130a, 9130b to the same respective symbol, visibly illuminating thereon a pair of spot regions 9152 and 9154 that are within, and spaced linearly apart of each other along the field of view, see also FIG. 10. The spot regions 9152 and 9154 preferably are circular, near the ends of the scan and are illuminated both prior to and during the scan to locate and track the respective symbol both before and during the reading thereof. Both close-in and far-out symbols can be located and seen by the static twin beam aiming embodiment of FIG. 11, the far-out symbols, due to their greater distance from the head, being illuminated to a lesser intensity, but visible, nevertheless, by the user. As explained previously, the pair of fixed spots 9152 and 9154 provide valuable assistance in terms of tracking the scan across the symbol.

Figure 12:
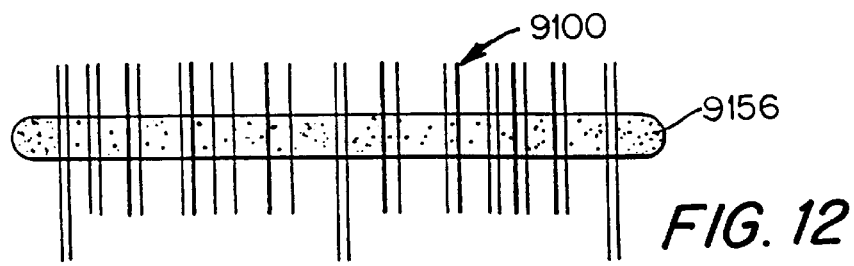
FIG. 12 is an enlarged view of a symbol and the parts thereof which are illuminated by a dynamic single-beam aiming.

Turning next to a third dynamic single beam aiming embodiment, and with the aid of FIG. 10, rather than stationarily mounting the focusing lens 9142 in the head, the lens 9142 may be oscillated in the manner described previously for the scanning/collecting/focusing component to sweep the aiming light beam across the respective symbol, illuminating thereon a line region 9156; see FIG. 12, extending along the field of view. The line region 9156 is illuminated during the scan to track the respective symbol during the reading thereof. Close-in symbols are well illuminated by the line region 9156, even when the scan is performed at rates of 40 scans per second; however, for far-out symbols, the greater the distance from the head and the faster the scan rage, the less visible is the line region 9156.

Returning to FIGS. 5–7, a combination static/dynamic aiming arrangement is shown which is actuated by the trigger 32 among various positions or states. In FIG. 6, the trigger 32 is shown in an off state, wherein all the actuatable components in the head are deactivated. A pair of electrical switches 9158 and 9160 are mounted on the underside of board 984. Each switch 9158, 9160 has a spring-biased armature or button 9162, 9164 which, in the off state, extend out of the switches and bear against opposite end regions of a lever 9166 which is pivoted at a center-offset position at pivot point 9168 on a rear extension 9170 of the trigger 932.

When the trigger 932 is initially depressed to a first initial extent, the lever 9166 depresses only the button 9162, and the depressed switch 9158 establishes a first operational state in which the trigger 932 actuates the aiming light 9130 as shown in FIG. 7 only, whose aiming light beam is thereupon reflected rearwardly off cold mirror 978 and reflected forwardly off the focusing mirror 976 to the symbol. In said first operational state, the trigger has also positioned the focusing mirror 976 in a predetermined stationary position. The stationary focusing mirror 976 directs the aiming light beam to the symbol, visibly illuminating thereon a spot region, identical to central spot region 9150 in FIG. 10 within the field of view prior to the scan to assist the user in locating the symbol before the reading thereof. The stationary positioning of the focusing mirror 976 is advantageously accomplished by energizing a DC winding of the scanning motor 970 so that the output shaft and the focusing mirror 976 mounted thereon are angularly turned to a central reference position.

Thereupon, when the trigger 932 is depressed to a second further extent, the lever 9166 depresses not only the button 9162, but also the button 9164, so that a second operational state is established. In said second operational state, the trigger actuates all the remaining actuatable components in the head, e.g. the laser diode 942, the control circuitry of the scanner motor 970 which causes the focusing mirror 976 to oscillate, and the photodiode 980, the signal processing circuitry, as well as the other circuitry in the head, to initiate a reading of the symbol. The focusing mirror 976 no longer is stationary, but is being oscillated so that the aiming light beam dynamically is swept across the symbol, visibly illuminating thereon a line region, identical to line region 9156 in FIG. 12, extending along the field of view. Hence, during the scan, the user is assisted in tracking the symbol during the reading thereof. Such symbol tracking is highly visible for close-in symbols, but less so for far-out symbols.

The aforementioned sequential actuation of the components in the head could also be done with a single two-pole switch having built-in sequential contacts.

The laser scanning head of FIG. 6 is of the retro-reflective type wherein the outgoing incident laser beam, as well as the field of view of the sensor means, are scanned. It will be readily understood that other variants also are within the spirit of this invention. For example the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

A variety of housing styles and shapes dictated by such considerations as aesthetics, environment, size, choice and placement of electronic and mechanical components, required shock resistance both inside and outside the housing, may be employed in place of the housing shown in the drawings.

The laser scanning head of this invention need not be handheld, but can also be incorporated in a desk-top, stand-alone workstation, preferably underneath an overhead window or port through which the outgoing incident laser beam is directed. Although the workstation itself is stationary, at least during the scanning of the symbol, the symbol is movable relative to the workstation and must be registered with the outgoing beam and, for this purpose, the aiming light arrangement described herein is particularly advantageous.

It should be noted that the laser scanning head of this invention can read high-, and medium- and low-density bar code or other symbols within approximate working distance ranges of 1" to 6", 1" to 12", and 1" to 20" respectively. As defined herein, the high-, medium- and low-density bar code symbols would have bars and/or spaces whose smallest width is on the order of 7.5 mils, 15–20 mils and 30–40 mils, respectively. In the preferred embodiment, the position of the reference plane for a symbol of known density is optimized for the maximum working distance for that symbol.

To assist the user in aiming the head at the symbol, in addition to the aiming light arrangements described herein, other means may be provided. For example, a mechanical aiming means such as a raised sighting element formed on an upper portion of the housing and extending along the direction of the first or second optical path may be sighted along by the user. A viewpoint having a sight window may also be located on the head to enable the user to look through the sight window and thereby visually locate the symbol in the window. A sonic ranging means can also be used for finding the symbol. The ranging means emits a sonic signal, detects a returning echo signal, and actuates an auditory indicator upon such detection. The auditory indicator can sound a tone or change the rate of a series of sounds or beeps, thereby signaling the user that the symbol has been found.

In another aspect of this invention, it is sometimes desirable to cause the aforementioned aiming light spots on the symbol to blink, e.g. for the purpose of making the spots easier to see, or to reduce the average power consumed by the aiming light sources. Such blinking light spots can be effected by electrical and/or mechanical means.

The present invention also provides a method and apparatus for operating an indicia reading system in which two different types of symbols may be read—e.g., a standard linear bar code symbol, and a two-dimensional bar code. The present invention also provides a technique for selecting whether a laser scanner using a light beam to scan a symbol, or CCD imaging and scanning a field of view, is utilized.

Figure 13:
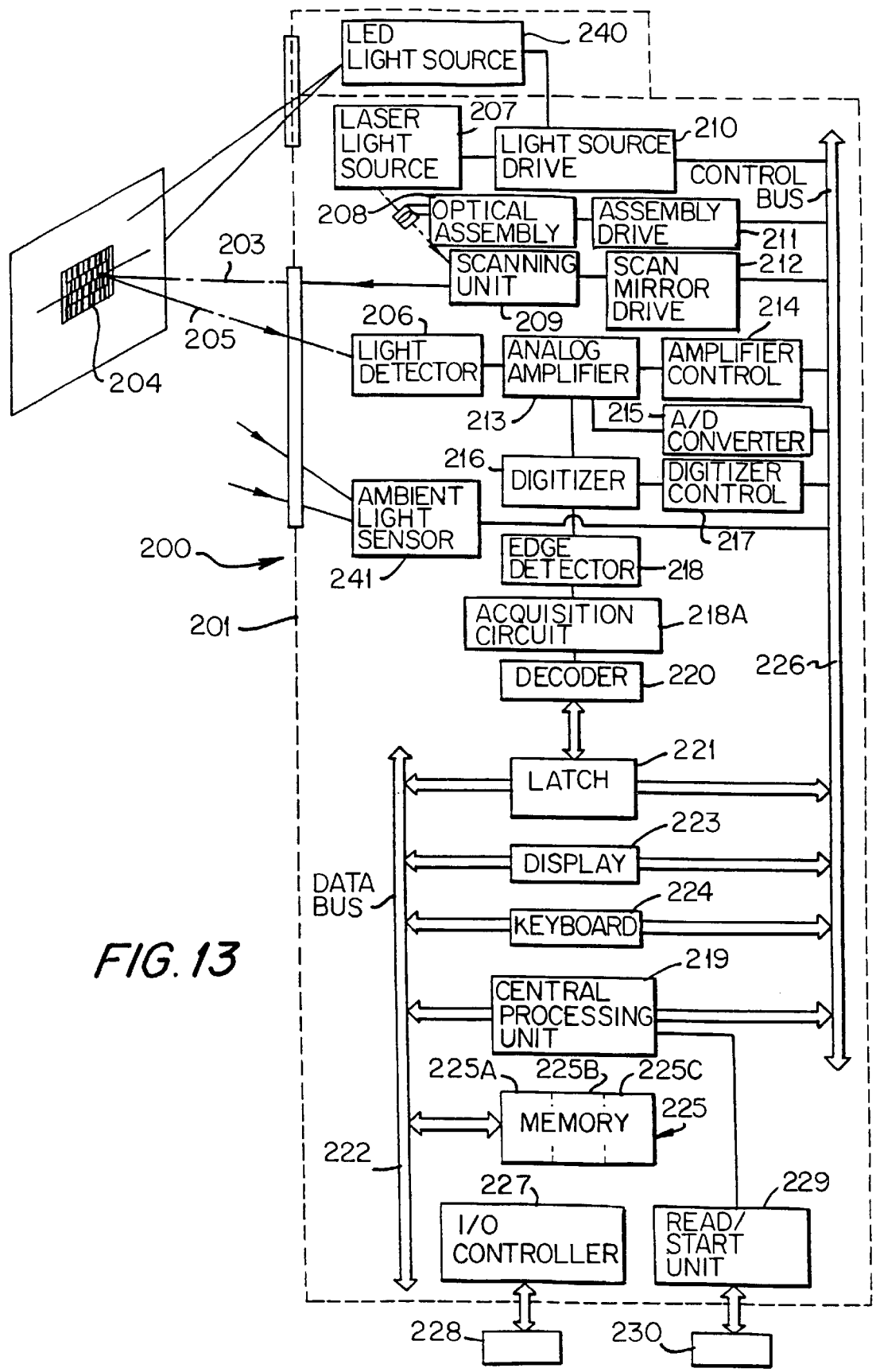
FIG. 13 is a block diagram of the scanning system according to the present invention.

Referring to FIG. 13, there is shown a highly simplified block diagram representation of an embodiment of one type of indicia reader that may be designed according to the principles of the present invention. The reader 200 may be implemented in a portable scanner, or as a desk-top workstation or stationary scanner. In the preferred embodiment, the reader is implemented in a light-weight plastic housing 201.

In one preferred embodiment, the reader 200 may be a gun-shaped device, having a pistol-grip type of handle; another embodiment is a hand-mounted unit. A movable trigger switch (shown in FIGS. 1 and 6 on the housing may be employed to allow the user to manually activate the scanner when the user has positioned the device to point at the symbol to be read. Various "triggerless" activation techniques can also be used as will be subsequently described.

The first preferred embodiment may generally be of the style disclosed in U.S. Pat. No. 4,760,248, issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al., or U.S. Pat. No. 4,409,470 issued to Shepard et al., both such patents being assigned to Symbol Technologies, Inc., may be employed in constructing the bar code reader unit of FIG. 13. These patents, U.S. Pat. Nos. 4,760,248, 4,896,026 and 4,409,470, are incorporated herein by reference, but the general design of such devices will be briefly described here for reference.

Turning to FIG. 13 in more detail, an outgoing light beam 203 is generated in the reader 200 by a light source 207, usually a laser diode or the like. The light beam from light source 207 is optically modified by an optical assembly 208 to form a beam having certain characteristics. The beam sized and shaped by the assembly 208 is applied to a scanning unit 209. The light beam is deflected by the scanning unit 209 in a specific scanning pattern, i.e. to form a single line, a linear raster scan pattern, or more complex pattern. The scanned beam 203 is then directed by the scanning unit 209 through an exit window 202 to impinge upon a bar code or other symbol 204 disposed on a target a few inches from the front of the reader. In the embodiments in which the reader 200 is portable, the user aims or positions the portable unit so this scan pattern transverses the symbol 204 to be read. Reflected and/or scattered light 205 from the symbol is detected by a light detector 206 in the reader, producing electrical signals to be processed and decoded for reproducing the data represented by the symbol. As used hereinafter, the term "reflected light" shall mean reflected and/or scattered light.

The characteristics of each of the optical components 207, 208 and 209 may be independently controlled by drive units 210, 211 and 212 respectively. The drive units are operated by digital control signals sent over the control bus 226 by the central processing unit 219, which is preferably implemented by means of a microprocessor contained in the housing 201.

A second, optional light source 240, such as an LED array, may also be provided and independently controlled by drive unit 210.

The output of the light detector 206 is applied to an analog amplifier 213 having an adjustable or selectable gain and bandwidth. An amplifier control unit 214 is connected to the analog amplifier 213 to effect the appropriate adjustment of circuit values in the analog amplifier 213 in response to control signals applied to the control unit 214 over the control bus 226. An ambient light sensor 241 is also provided which provides an output to the control bus 226.

One output of the analog amplifier 213 is applied to an analog-to-digital (A/D) converter 215 which samples the analog signal to be tested by the CPU 219. The A/D converter is connected to the control bus 226 to transfer the sampled digital signal for processing by the CPU 219.

Another output of the analog amplifier 213 is applied to a digitizer 216. The digitizer 216 converts the analog signal from the analog amplifier 213 into a pulse width modulated digital signal. One type of digitizer is described in U.S. Pat. No. 4,360,798. Circuits such as those contained in digitizer 216 have variable threshold levels which can be appropriately adjusted. The digitizer control unit 217 is connected to the digitizer 216 and functions to effect the appropriate adjustment of threshold levels in the digitizer 216 in response to control signals applied to the control unit 217 by the CPU 219 over the control bus 226.

The output of the digitizer 216 is applied to an edge detector 218. The operation of the edge detector 218 can be explained with reference to the discussion in co-pending Ser. No. 07/897,835 with respect to corresponding component 118 in that application.

The edge detector 218 is connected to the decoder 220, which functions in the manner described in the background of the invention.

More specifically, the decoder may operate as follows. First, a timer/counter register (which may be in the CPU microprocessor 219) is reset to all zeros. Operating as a timer, the register is incremented every machine cycle until another digital bar pattern (DBP) transition occurs. Whenever a DBP transition occurs the value of the counter, or the value 255 if an overflow had occurred, is transferred to another register, and then into memory. The value of the register represents the number of machine cycles between DBP transitions, i.e., the pulse width. After the value of the register is transferred, it is once again reset to zeros and the incrementing process continues until the next transition.

At any time a bar or space may last for more than 255 count cycles. If this occurs a timer overflow interrupt is generated. The CPU 219 may run an interrupt service routine in response to the interrupt. This routine sets a flag that is used at the next DBP transition to indicate that an overflow had occurred. The interrupt service routine also checks whether the Start of Scan (SOS) signal has changed from its state at the beginning of this scan data acquisition process. If SOS has changed, a value of 255 is written as the width of the last element and the data acquisition process terminates. The end result is that a sequence of words are stored in memory, with each 16-bit word representing, for example, the pulse width representing the successive bars and spaces detected by the bar code reader.

The decode algorithm operates on the data in memory as the following exemplifies. First, right and left quiet zones are found by searching the data in memory for spaces which are large in comparison to neighboring data elements. Next, the decode of each character proceeds, beginning from the element to the right of the left quiet zone. The decode process for each character is specific to each symbology. Therefore, different character decode algorithms may be applied if the decoder is set to auto-discriminate code types. In general, the decode applies mathematical operations to calculate the number of unit modules encoded in each element, or pairs of elements for so called "delta codes" such as Code 128 and UPC. For so called "binary" codes, such as Code 39, the decoder applies mathematical operations to calculate a threshold between wide and narrow elements and then performs a relational comparison between each element and the threshold. The threshold is calculated dynamically, that is, the threshold is not the same for all the elements.

The decoded data is stored in a latch 221 which is connected to a data bus 222. The latch 221 is also connected to a control bus 226 which is also connected to the CPU 219.

In the preferred embodiment, the processing of either the pulse width data, or the decoded data, is implemented in software under control of the CPU 219. The following discussion presents an example of an algorithm that may be implemented in a computer program in the reader according to the present invention.

Figure 14:
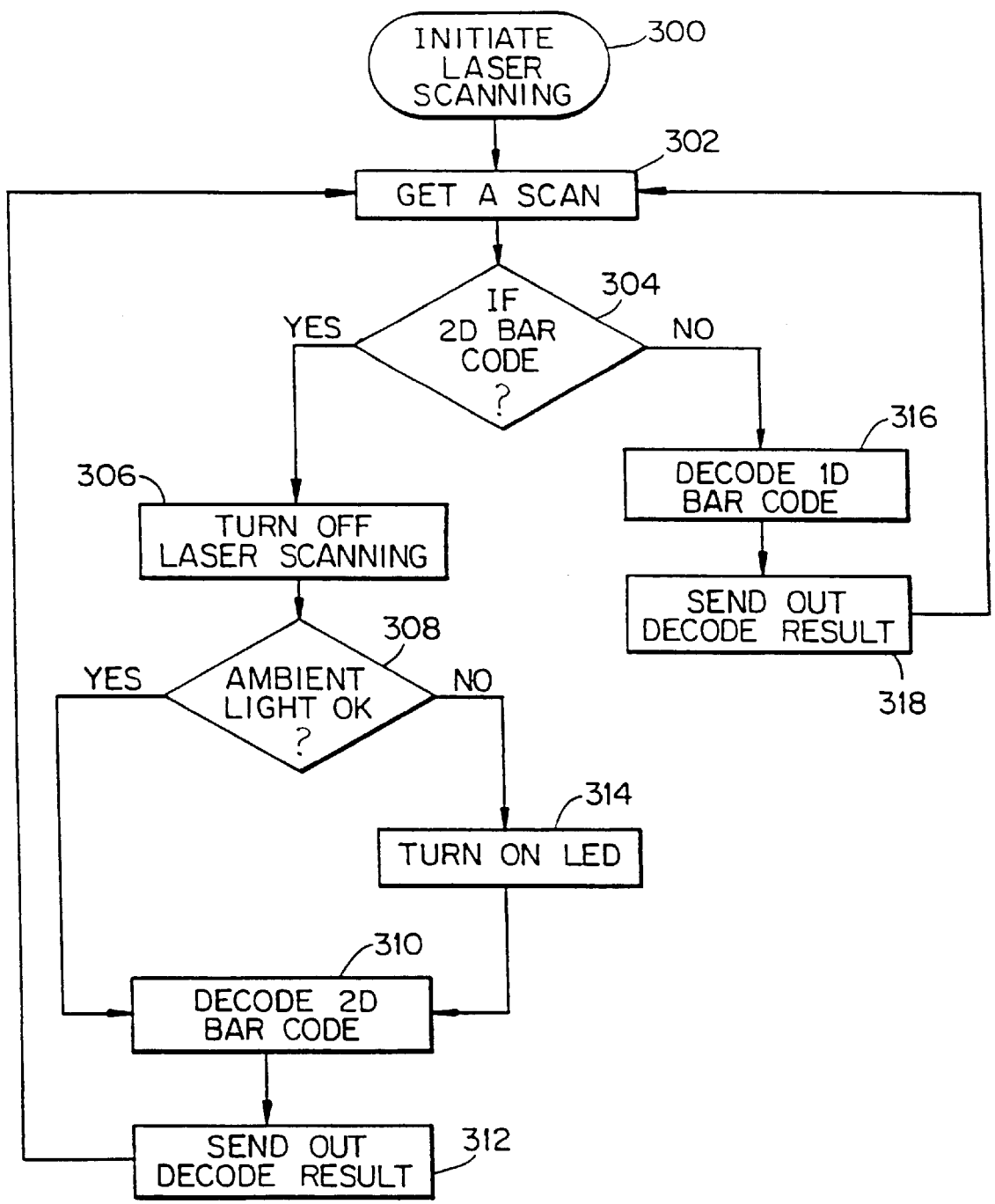
FIG. 14 is a flow chart of the operation of an algorithm used in the present invention.

FIG. 14 is a flow chart of an algorithm according to the present invention that functions to determine whether a portion of a 1D or 2D bar code symbol has been read, and whether the type of scanning to be used should be modified, or other parameters under control of the scanning system, such as the light level in the field of view, should be adjusted. It is assumed that certain predetermined initialization parameters are automatically set when the scanner is turned on, as represented by block 300. The scanner is then placed in an "interpret" mode (as opposed to a "read" mode) and the algorithm proceeds as shown in FIG. 14.

In accordance with FIG. 14, a scan is obtained in step 302 by scanning the field of view with a laser beam and detecting the reflected light with FIG. 13 detector 206. A determination is made in step 304 to determine if a two-dimensional bar code has been scanned. If the determination is positive, the laser light source is deactivated in step 306. The ambient light level is reviewed, typically against a predetermined threshold, in step 308. If the ambient light is sufficient to obtain a satisfactory read, the scan is processed through the decoder in step 310 and the results of the decoding are transmitted to the scanner in step 312 and the scan parameters modified in response thereto, if appropriate. If, in step 308, it is determined that the ambient light is insufficient to obtain a satisfactory read, then the LED is activated in step 314. The scan is then decoded and the decoding results transmitted as described above. If, in step 304, it is determined that a one dimensional bar code has been scanned, the scan is decoded in step 316 and the results of the decoding are transmitted to the scanner in step 318 and the scan parameters modified in response thereto, if appropriate. If desired, an ambient light level check, as performed in step 308, could also be performed for scans of one dimensional bar codes.

Figure 15B:
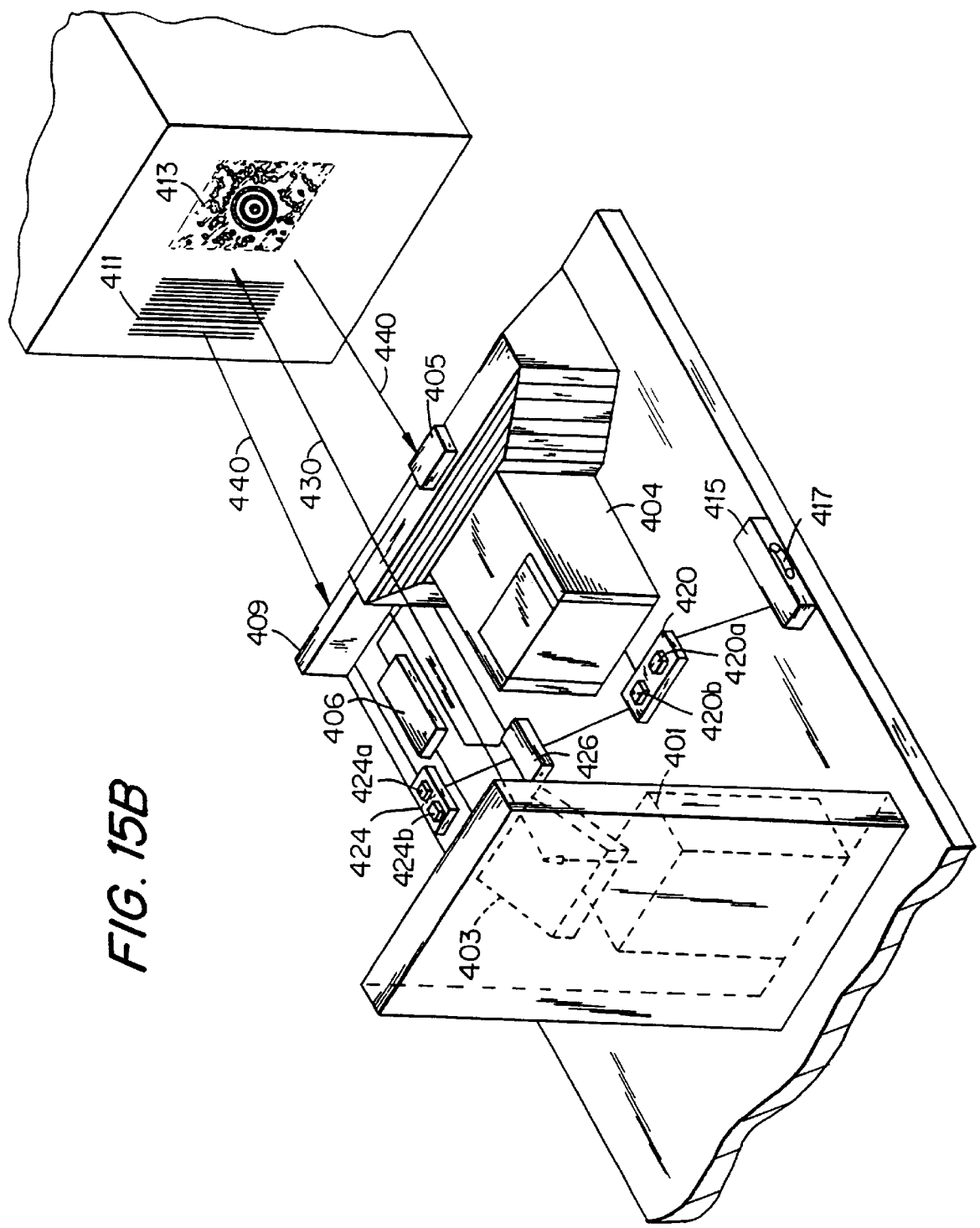
Figure 16A:
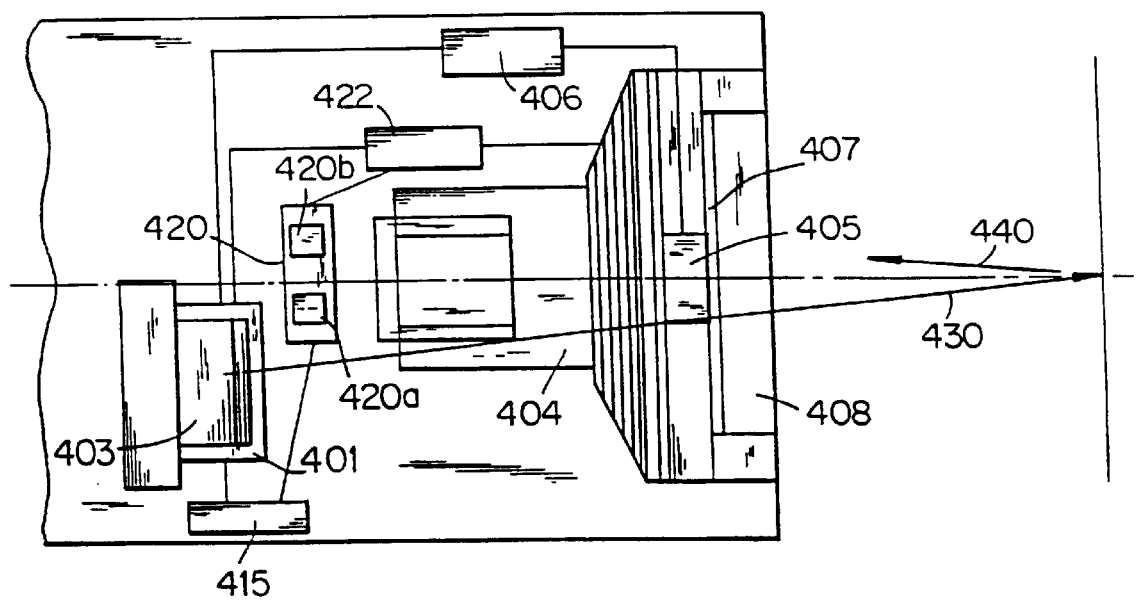
FIGS. 16A–16B are respectively a plan and elevation view of the hybrid scanner of FIG. 15A.
Figure 16B:
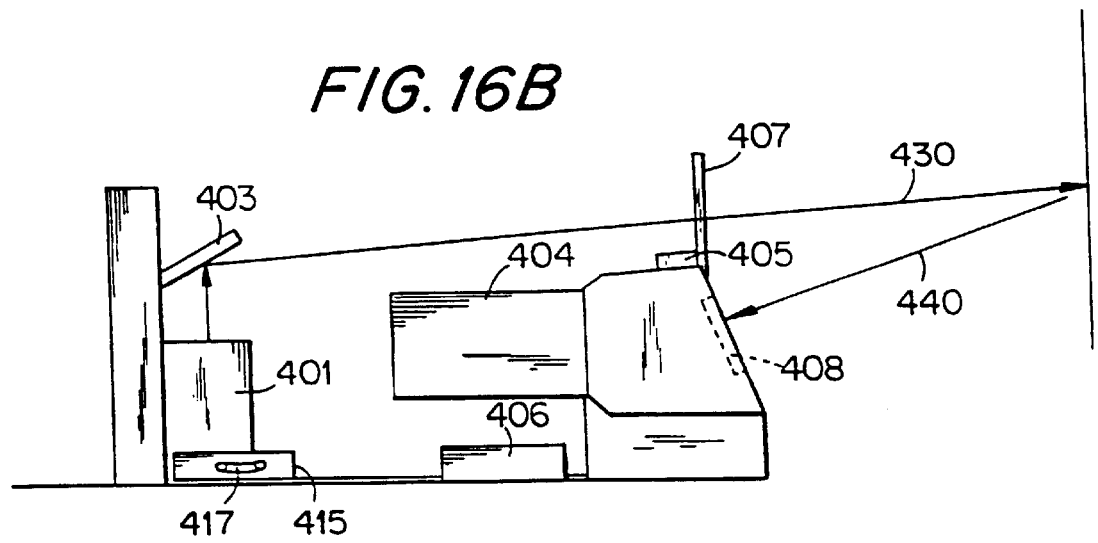

FIG. 15A is a perspective view and FIGS. 16A–16B a plan and elevation view of a hybrid scanner in accordance with a further embodiment of the present invention. A scan assembly including a laser diode, optics and scan engine 401 emit a visible light beam 430. The beam is reflected from mirror 403 towards the targeted symbol which can be a one dimensional bar code as shown or a more complex symbol such as a matrix array to geometric shapes. The scan assembly 401 produces a visible scanning light beam, such as a flying spot light beam, which, when directed off mirror 403, forms a scan line across the targeted symbol. A charge coupled device (CCD) or other solid state imaging device 404, which includes an array of detection elements detects or images reflected visible light 440 from the symbol towards which the visible scanning light beam 430 from laser diode of assembly 401 has been directed. The reflected light 440 passes through conventional optics 408 (as shown in FIGS. 16A and B) which are disposed in front of the CCD 404 detection element array. Optics 408 are automatically self focussing, so as to adjust the focal point of the image on the array of detection elements. The visible light beam 430 is beneficially used to aim the scanner at the target. The CCD 404 reads the targeted symbol using either reflected ambient light or the reflected light from the visible light beam 430 or both.

Another feature of the present invention when operating in the scanning laser beam/scanning CCD detector mode is the correlation of the speed of scanning of the laser beam with respect to the speed of scanning by the CCD detector. In the preferred embodiment, the laser beam is scanned at a much faster rate than the CCD is scanned. Thus the entire symbol is illuminated over a short period of time, and the entire CCD array integrates the light received over that period of time. The effect on the CCD is to produce an image equivalent to a narrow fixed beam of light illuminating the symbol, such as described in the related patent application entitled "Method and Apparatus for Reading Two-Dimensional Bar Code Symbols with an Elongated Laser Line." In another embodiment, requiring more sophisticated digitizing and data processing, the laser beam may be scanned much slower than the CCD detector. In such an embodiment the laser spot ideally illuminates just one pixel of the CCD detector at a time. Thus, the reflectivity of that pixel on the target becomes the principal signal response in the field of the view during a single scan by the CCD detector.

Since the appropriate scanning rate may not be known a priori, another feature and embodiment of the present invention is to slowly vary the scanning rate (of either the scanning laser beam, or the CCD detector, or both) over a predetermined range if the initial scanning rates do not result in symbol decoding. For example, the individual detection elements can be scanned at a variable scanning rate under the control of controller 415 which can be actuated, for example, by toggle switch 417, or automatically by software implemented by processor 420, to change the scanning rate.

As shown, CCD 404 is a two-dimensional CCD camera. The scan engine is preferably small, for example, an SE-1000 scan engine manufactured by Symbol Technologies, Inc. The CCD has a one-third inch two-dimensional array, preferably 500 by 500 pixels. The field of view of the CCD is greater than 30 degrees and is plus or minus 20 degrees for the one-dimensional laser scanner. The working range of the system shown is approximately 4 to 10 inches for a MaxiCode, UPSCODE(TM) or one-dimensional UPC code.

A processor 420, including a conventional decoder 420a and a symbol discriminator 420b to determine if the symbol being read is of the particular symbology type, e.g. a matrix code such as a UPSCODE(TM) symbology, which the hybrid scanner is designed to read. The symbol discriminator receives a signal corresponding to the electrical signal generated by the CCD which represents the sensed reflected light. The symbol discriminator 420b implements an algorithm to determine if the received signal is of a type which the scanner is capable of decoding. If a "yes" determination is made, the signal is decoded by the decoder 420a. The symbol discriminator 420b, for example, can be implemented using a comparator circuit or other conventional means, to determine if the symbol conforms to the appropriate symbology type. Symbol discriminator 420b could, if desired, be replaced by software which implements the discrimination algorithm and is stored in the memory of processor 420 as discussed above in connection with FIG. 14. If the target is determined to be a conforming symbol, the decoder 420a decodes the signal and the decoded signal is transmitted to, for example, a storage device, display or further processing circuitry as discussed above with reference to FIG. 13. If the target symbol is determined by the symbol discriminator 420b to be of a non-conforming symbology, the discriminator 420b transmits a signal, for example, to the deactivator 422 and the deactivator 422 in turn transmits a signal to deactivate the CCD 404 and, if desired, the scan assembly 401.

In operation, the FIG. 15A scanner is capable of reading a symbol located within an approximate range of 4 to 10 inches from the scanning head window 407 shown in FIGS. 16A and 16B. Although a laser diode is shown in FIGS. 15A and 16A-16B, a light emitting diode (LED) could be alternatively used. If an LED is used in lieu of a laser diode, the symbology discriminator implements the algorithm shown in FIG. 14. In either configuration, an ambient light detector 405 can be used, as appropriate, to ensure that there is sufficient ambient light to obtain a proper read of the targeted symbol. The ambient light detector detects the ambient light in the field of view of the CCD. If the CCD is to image ambient light, the visible light beam is used only for aiming or orientation. In such a case, if a desired threshold is met indicating sufficient ambient light for a read, the laser diode is activated by activator 406 to target the symbol. The activator 406 may also activate the CCD, if not otherwise activated, to image the symbol. Alternatively, if reflected visible light from the emitted light beam will be detected, the ambient light detector 405 and activator 406 may be unnecessary. As a third alternative, the CCD may be capable of sensing either reflected ambient light or reflected light from the visible light produced by the laser or light emitting diode. In this case, the laser diode or LED are activated only when an ambient light threshold level is not reached, indicating that the ambient light level is insufficient to obtain a proper read. The ambient light detector 405 and activator 406 are of conventional design and can be implemented in any of a number of well known ways. It should be understood that the scanner of FIG. 15A could include features described above in connection with the other embodiments of the invention. The CCD sensor can also function as a range finder as described with reference to FIG. 18 below.

FIG. 15B depicts a somewhat altered configuration of the hybrid scanner of FIG. 15A. The FIG. 15B configuration is particularly suitable for reading dual symbols of different symbology types on a single package. For example, as shown in FIG. 15B a UPC symbol 411 is located adjacent to a UPS code symbol 413. The UPC code 411 may, for example, encode information relating to the contents of the package while UPS code 413 may include customer and/or destination information.

The 15B configuration is identical to that of the FIG. 15A embodiment except as noted below. A photodetector 409, such as a photodiode, is included in the FIG. 15B configuration and is used to detect the reflection of light 440 from the scanning light beam 430 off the UPC symbol 411. For reading two symbols on a single package, the CCD 404 separately images the reflected light 440 from the UPS code symbol 413. The reflected light imaged by the CCD 404 may be either ambient light or light from the scanning light beam. The symbols are separately processed in the conventional manner. The processing may be performed, in whole or in part, within the scan unit as may be desirable for the applicable application. The scanning beam scans across both symbol 411 and 413 and is used both for aiming and/or orienting the scan unit as well as for producing the light which will be detected after reflection from symbol 411. The light beam could be used, with respect to symbol 413, solely for aiming/orienting purposes. However, the light beam could also be used for reading the symbol 413.

A processor 420, identical to that described with reference to FIG. 15A above, includes a conventional decoder 420a and symbol discriminator 420b. The discriminator 420b determines if the symbol 413 being read by the CCD is of a particular symbology type, e.g. a matrix code conforming to UPSCODE(TM) symbology. Additionally, a processor 424, including a conventional decoder 424a and symbol discriminator 424b, is provided to determine if the symbol 411 being read by the photodiode 409 is of a particular symbology type, e.g. a bar code conforming to a UPC code symbology.

As described with reference to the FIG. 15A scanner, the symbol discriminator 420b receives a signal corresponding to an electrical signal generated by the CCD 404, which in turn corresponds to the imaged reflected light off symbol 413. The received signal is transmitted to the decoder 420a if the symbol discriminator 420b determines that the symbol 413 confirms to the appropriate symbology type. If the target is determined to be a conforming symbol, the decoder 420a decodes the signal and transmits the decoded signal to, for example, a storage device, display or further processing circuitry. If the target symbol is determined by the symbol discriminator 420b to be of a non-conforming symbology, the discriminator 420b transmits a signal to the activator/deactivator 426 reflecting the non-conforming nature of the target and, in response, the activator/deactivator 426 may, for example, transmit a signal to deactivate the CCD 404 and also, if desired, the photodiode 409. Activator/deactivator 426 is similar to deactivator 422 of the FIG. 15A scanner but is adapted to include the capability to activate and/or deactivate either or both of the CCD 404 and photodiode 409.

The symbol discriminator 424b receives a signal corresponding to an electrical signal generated by the photodiode 409, which in turn corresponds to the detected reflected light off symbol 411. The received signal is transmitted to the decoder 420a if the symbol discriminator 424b determines that symbol 411 conforms to the appropriate symbology type. The symbol discriminator 424b is similar to symbol discriminator 420b, and can use a comparator circuit, software or other conventional means to implement the applicable algorithm. If the target is determined to be a conforming symbol, the decoder 424a decodes the received signal and transmits the decoded signal to, for example, a storage device, display or further processing circuitry. If the target symbol is determined by the symbol discriminator 424b to be of a non-conforming symbology, the discriminator 424b transmits a signal to the activator/deactivator 426 reflecting the non-conforming nature of the target and, in response, the activator/deactivator 426 may, for example, transmit a signal to deactivate the photodiode 409 and also, if desired, CCD 404.

Figure 15C:
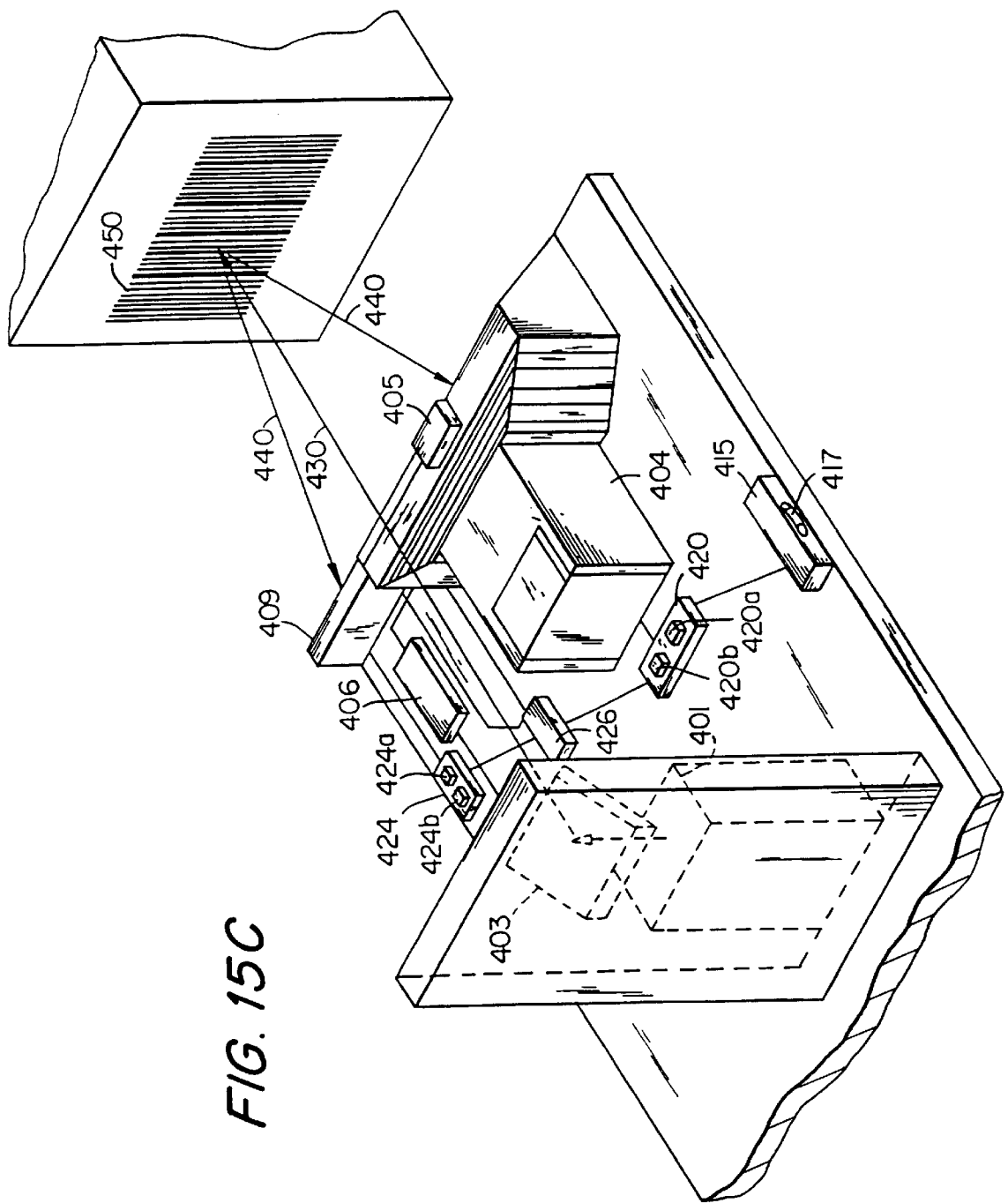

The FIG. 15C scanner, is an adaptation of the FIG. 15B scanner, which is particularly beneficial in operations where a single scanner with dual modalities is required or desired. Such a need may arise, for example, where different packages, each with a label which requires scanning and conforms to one of two symbology types, are inventoried in a similar location, such as a warehouse, trailer, or retail outlet, or are being moved along a single conveyor.

In such cases, one symbol type, such as a UPS or other matrix code, may be particularly suitable for imaging with CCD 404. Another symbol type, such as a bar code, may be more suitable for detection by a photodetector 409. The reflection of ambient or emitted light off one type of symbol may be used for imaging while the reflection of emitted light off the other type of symbol may be used for photodetection. The emitted light may, for example, be a flying spot visible light beam generated by a laser diode in scan assembly 401.

For such operations, as shown in FIG. 15C, both the CCD 404 and photodiode 409 are directed to scan a single targeted symbol 430 which may be either a UPC code or a UPS code, or other types of symbols conforming to differing symbology types. The CCD 404 images the reflection of visible ambient and/or emitted light off symbol 450. The photodiode 409 simultaneously detects the reflection of the flying spot light beam emitted by assembly 401 from the symbol 450. Symbol discriminators 420b and 424b respectively receive a signal corresponding to the electrical signal generated by the CCD 404 and a signal corresponding to the electrical signal generated by the photodiode 409. The respective signals are analyzed by symbol discriminators 420b and 424b.

In this case, if the signal received by discriminator 420b is determined by discriminator 420b to conform to UPSCODE(TM) symbology, the signal is decoded by decoder 420a and transmitted for storage, further processing, display or other operations, as appropriate. If, on the other hand, the imaged symbol is determined not to conform to UPSCODE(TM) then a signal is sent to the activator/deactivator 426 which accordingly sends a signal to deactivate the CCD. Preferably the CCD remains deactivated until a signal is transmitted from activator/deactivator 426 to deactivate photodiode 409, at which time activator/deactivator 426 also transmits a signal activating CCD 404. It will be understood that the deactivation of photodiode 409 and activation of CCD 404 will occur when a symbol subsequently targeted by the scanner conforms to UPSCODE(TM) rather than UPC code symbology.

Likewise, if the signal received by discriminator 424b is determined by discriminator 424b to conform to UPC code symbology, the signal is decoded by decoder 424a and transmitted from decoder 424a for storage, further processing, display or other operations, as appropriate. If, on the other hand, the detected symbol is determined not to conform to the UPC code symbology then a signal is sent by discriminator 424b to the activator/deactivator 426 which accordingly sends a signal to deactivate the photodiode 409. Preferably the photodiode remains deactivated until a signal is transmitted from activator/deactivator 426 to deactivate CCD 404, at which time activator/deactivator 426 also transmits a signal activating photodiode 409. Here it should be understood that the activation of photodiode 409 and deactivation of CCD 404 will occur when a symbol subsequently targeted by the scanner is determined to conform to UPC code symbology rather than the UPSCODE(TM) symbology.

If desired, only a single detector, i.e. either the CCD or photodiode, could be initially activated. One or more indicators might also be provided to notify a user if the CCD or photodiode are active or have been activated or deactivated. Each scanner will also typically include one or more digitizers for digitizing a signal corresponding to an electrical signal generated by the CCD or photodiode, as applicable, prior to symbol discrimination and decoding. Additional photodetectors, CCD's and processors could be added, with minor modifications to the activator/deactivator 426, to provide for additional modalities and further flexibility in reading individual symbols which may be of any one of three or more symbology types. Furthermore, the activator/deactivator 426 could be eliminated if desired. In such a configuration, the CCD or photodiode could be selectively activated by, for example, a manual switching mechanism or could both be continuously activated irrespective of the symbology type of the symbols being targeted during a particular time period.

Using the FIG. 15C system, the scanner operates in two distinct modalities, one for reading bar code symbols and the other for reading matrix codes. The symbol discriminators 420b and 424b determine if the targeted symbol 430 is of a predetermined category or symbology type. If a signal is received by the activator/deactivator 426 from only one of the discriminators 420b and 424b, it indicates that the category of the targeted symbol necessarily conforms to the predetermined symbology type acceptable to the other symbol discriminator. If signals are received by activator/deactivator 426 from both discriminators 420b and 424b then the category of the targeted signal is necessarily outside the predetermined categories for the scanner. Hence, either of the two modalities are selected in response to a signal received from one of the two symbol discriminators. In one modality the CCD is activated to read matrix codes by imaging reflected ambient and/or emitted light. In the other modality the photodiode is activated to read bar codes, such as stacked bar codes or adjacent rows of linear bar codes, using emitted light, perhaps in the form of a flying spot light beam, reflected off the symbol.

Figure 17:
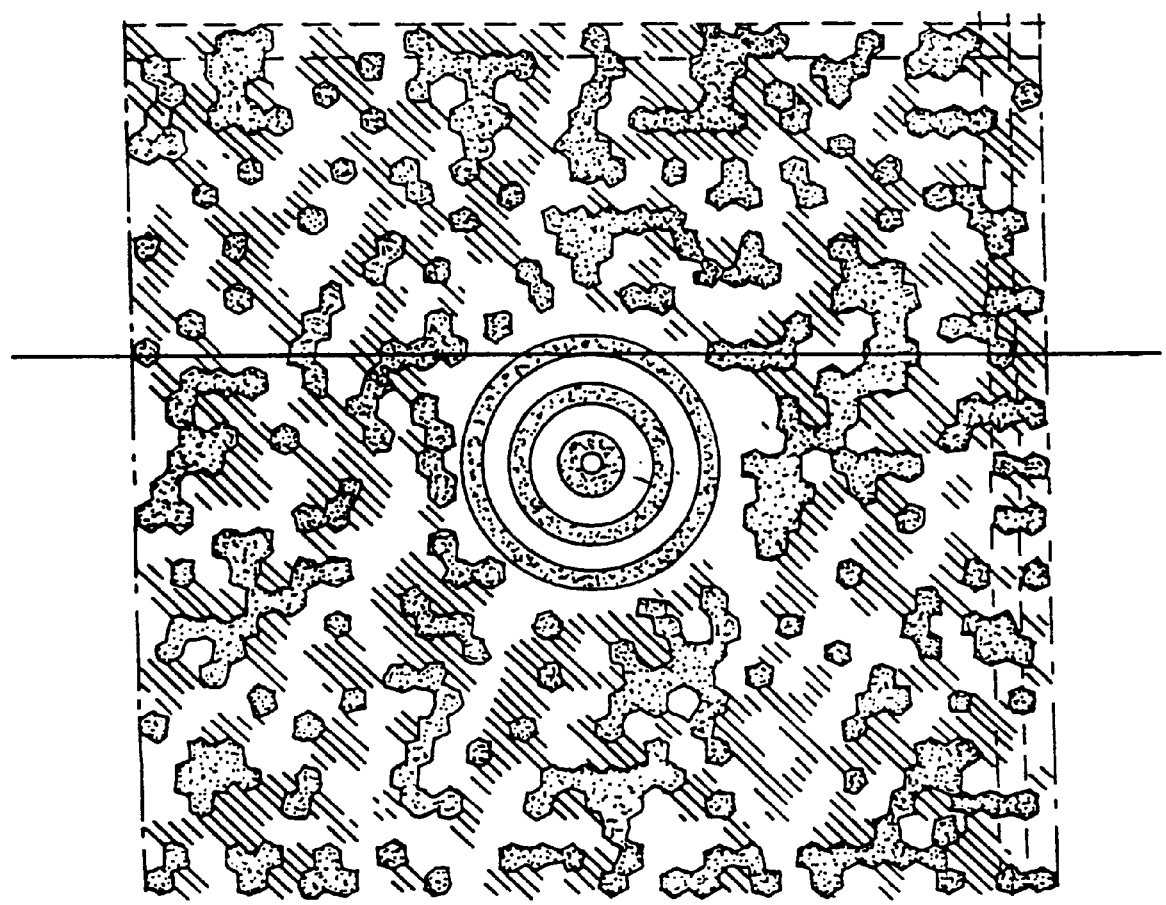
FIG. 17 depicts the scan line formed across a bar code symbol using the hybrid scanner of FIG. 15A.

FIG. 17 depicts a single scan line capable of being generated by the scanner of FIGS. 15A, 15B and 15C across a UPS symbol formed with a matrix array of geometric shapes. By using a modified scan assembly 401 other scan patterns could be formed. For example, if desired a scanner assembly could be substituted which would generate a raster, omni-directional or other scan pattern.

FIGS. 18A–18D depict various aspects of the range finder which may be included in any of the above described embodiments of the invention. Range finders are typically included in devices such as auto focus type cameras. As shown, the sensor array 1600, such as a CCD array, and lens 1602 sense the movement and position of the image produced by the scanning light beam 1604 as the distance between the symbol 1660 and the scanner 1650 increases or decreases. No secondary light source is required for range finding. A positive sensitive sensor could be used in lieu of sensor array 1600 if desired. The results of the range finding can be used in an algorithm, such as that described with reference to FIG. 14 above but directed to modify the scan parameters if the distance between the scanner 1650 and the symbol 1660 reach a predetermined threshold. For example, if a threshold is exceeded, it may be beneficial to activate an LED, even if the ambient light level appears to be sufficient to obtain a satisfactory scan. It may also be advantageous to adjust the characteristics of the optical components, as discussed with reference to FIG. 13, as the distance reaches one or more predetermined thresholds.

Figure 18A:
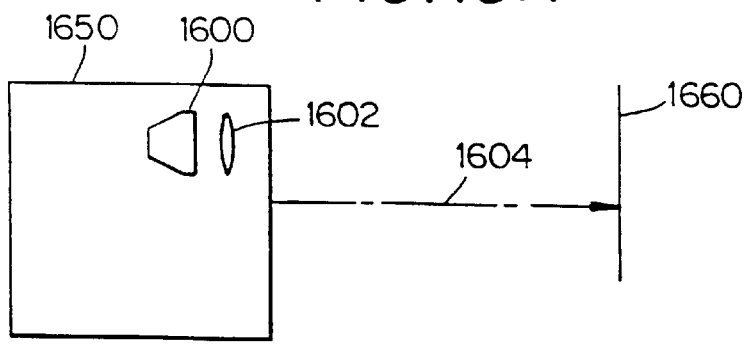
FIGS. 18A–18D are schematic representations of the range finder in accordance with the present invention.
Figure 18B:
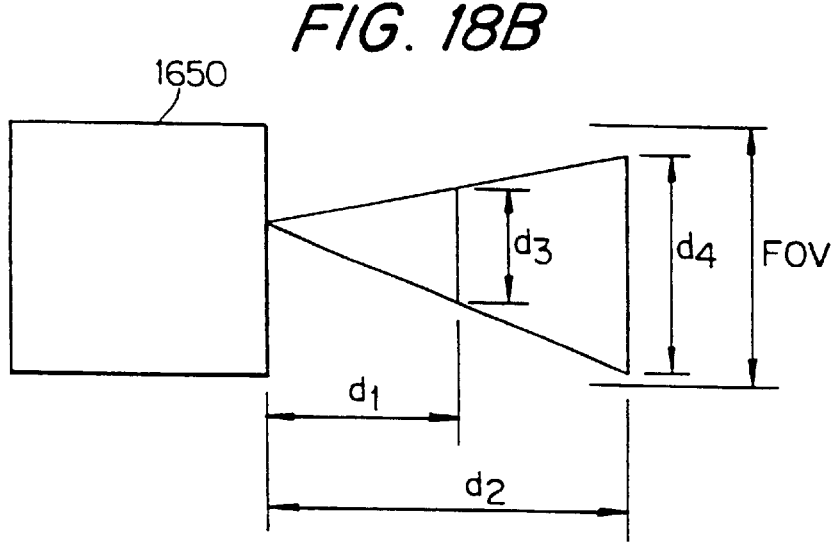
Figure 18C:
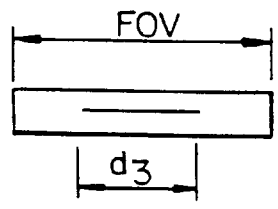
Figure 18D:
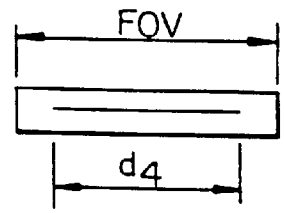

The operation of the range finder will now be described with reference to FIGS. 18B–18D. As shown the scanner 1650 has a field of view (FOV). The scan line image detected by the sensor array 1600 has a length $d_3$ when the targeted symbol 1660 is a distance $d_1$ from the scanner 1650. On the other hand, when the symbol 1660 is a distance $d_2$, which is greater than the distance $d_1$, from the scanner 1650, the scan line image detected by the CCD 1600 has a length of $d_4$ which is greater than $d_3$. Thus, the length of the scan line image detected by the sensor array 1600 can be used to determine the distance of the scanner 1650 from the target symbol 1660. Once the length of the image is determined, it can, for example be compared in a comparator circuit, by software implementing an appropriate algorithm, or using other conventional means, to correlate the length of the detected image with a distance or range of the symbol.

Figure 19A:
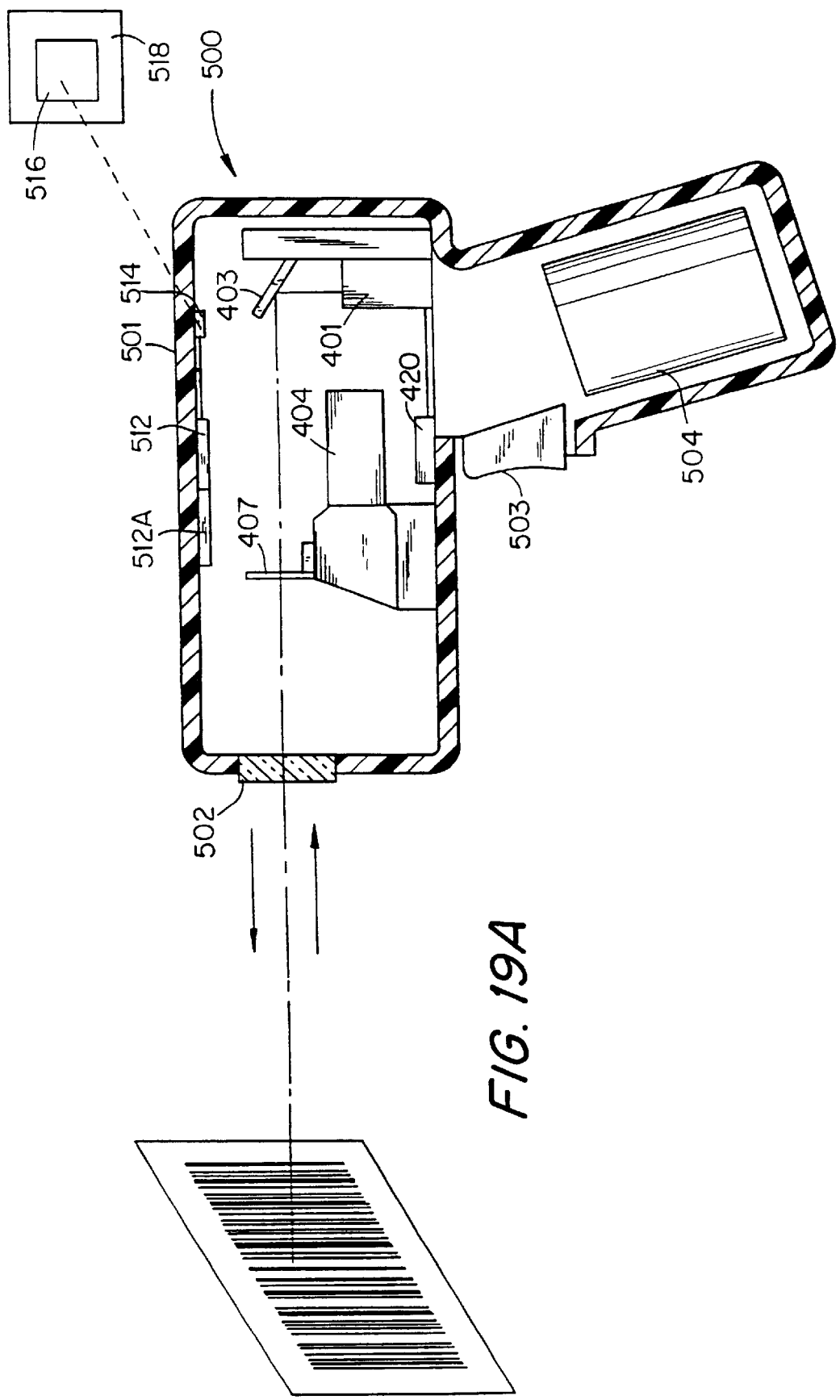
FIGS. 19A and 19B are respectively a simplified side sectional view and perspective view of the hybrid scanner of FIG. 15A, 15B or 15C housed in a narrow bodied, single windowed, gun-shaped housing.

FIG. 19A depicts a simplified sectional side view of a gun-shaped housing for a hybrid scanner of the type shown in FIGS. 15A, 15B or 15C. Gun-shaped housing 500 has a narrow body 501 and single window 502 through which the light beam is emitted and reflected light from the target enters the gun housing 500. A trigger switch 503 is provided for activating the scan assembly and detector, or detectors, and other components within the housing. The housing can house the processor 420 and other components described above, if provided. A battery 504 provides the power to the various components when the trigger 503 is squeezed. Conventional processing circuitry 512 is provided to generate a signal corresponding to the electrical signal generated by the sensor 404, and detector 409 (not shown) which is suitable for transmission by wireless transmitter 514 to a remote receiver 516 at, for example a central processing or electronic data storage device 518. The transmitter could if desired be a transceiver and might operate at radio or other frequencies which are suitable for accomplishing the transmission. The processing circuitry 512 includes an integrator 512A which processes the outputs of the individual detection elements of the CCD 404 into a single output signal prior to transmission.

Figure 19B:
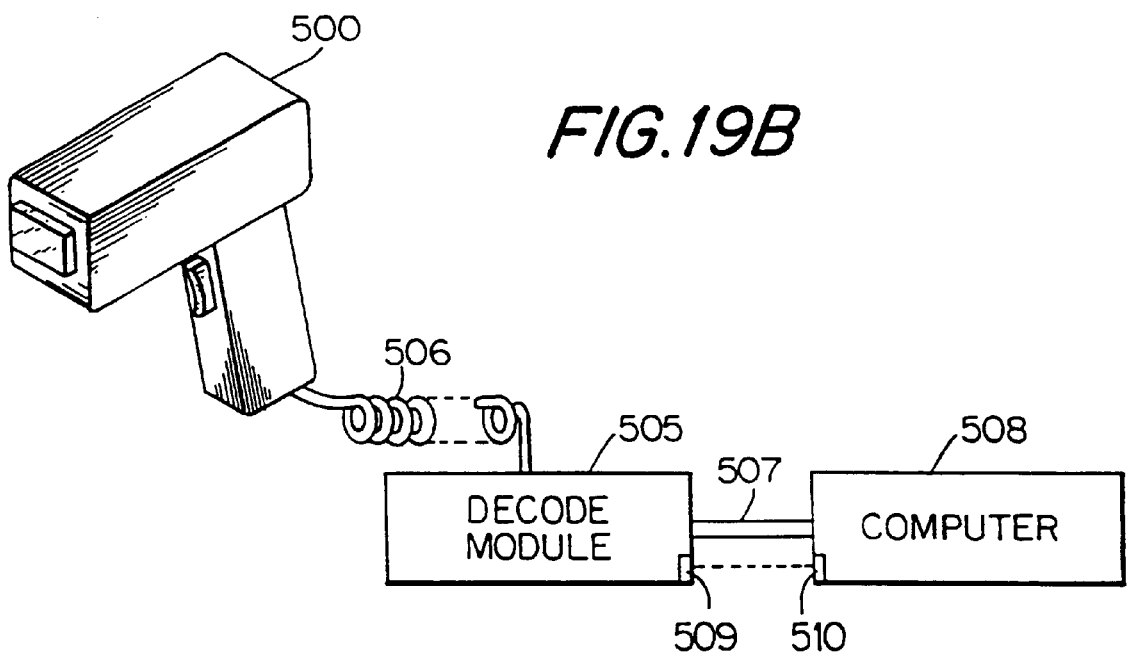

FIG. 19B depicts a perspective view of the gun-shaped scanner of FIG. 19A connected to a decode module 505 by a flexible cable 506. In this configuration, most, if not all, signal processing components and circuitry are located in the decode module rather than the gun-shaped housing. Electrical signals generated by the CCD 404 and/or photodiode 409 of FIGS. 15A–15C, or signals corresponding thereto, are transmitted from the gun-shaped housing 500 over the flexible cable 506 to the decode module 505. The decode module processes the received signal, preferably converting the received signal into a digitized signal and decoding the signal to obtain information representing the spatial intensity variations of the target. The decoded information can then be transmitted by way of communication cable 507 to a base computed 508 where the decoded information may be stored and/or further processed. Rather than a wire communication link 507, module 505 and computer 508 can be beneficially provided with transmitter or transceiver 509 and receiver or transceiver 510 to facilitate wireless communication of the decoded and other information. If transceivers are provided, a two-way communication link can be established such that information and instructions from computer 508 can, additionally, be transmitted to decode module 505.

Figure 20:
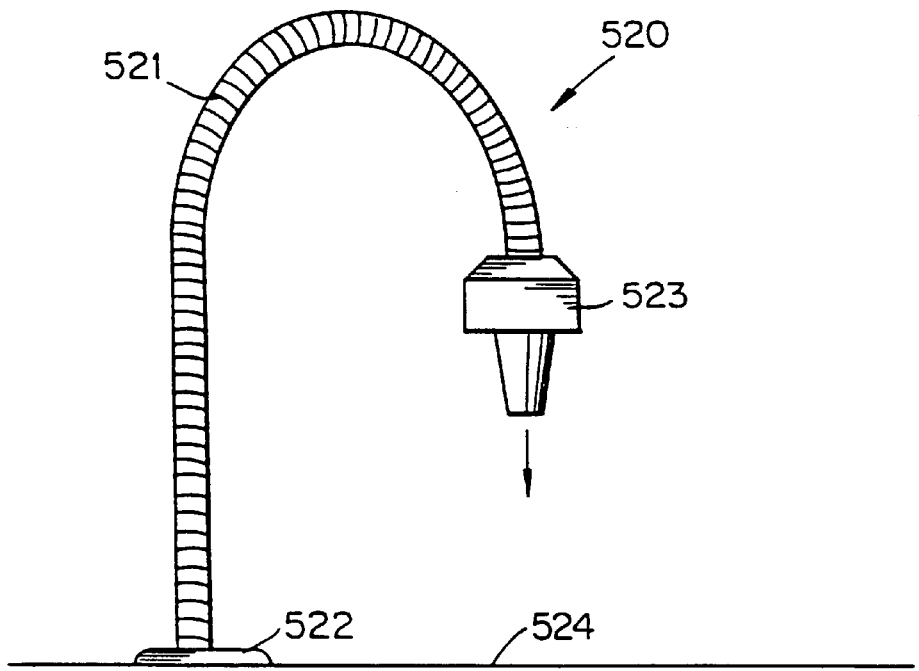
FIG. 20 depicts a goose head type housing for a hybrid scanner of FIG. 15A, 15B or 15C.

FIG. 20 depicts a goose head type stationary mount 520 which includes a flexible cantilevered portion 521 attached to a stabilizing base 522 and having a hybrid scanner housing portion 523 in which a hybrid scanner of the type shown in FIG. 15A, 15B or 15C is housed. The flexible cantilevered support member 521 can be adjusted to increase or decrease the distance between the housing 523 and the target. It also provides the flexibility to direct the emitted light in virtually any desired direction. The housing 523 can be fully rotated, i.e. 360°, around the base 522. As will be understood by those familiar with the art, the housing 523 can be directed to provide a light beam substantially parallel or perpendicular to the support structure 524 upon which the base 522 rests. Although a particular shape of housing 523 is depicted in FIG. 20, the housing shape could be in any desired form so long as one or more windows are placed in the housing which allow the emitted light beams and the reflected light from the target to pass in and out of the housing. Additionally, in lieu of housing 523, a mount (not shown) could, if desired, be provided on the end of the flexible cantilevered member 521 so as to accept the handle portion of, for example, the gun-shaped housing of FIG. 19A. Such a configuration would allow a hybrid scanner in a gun-shaped housing to be utilized both as a portable scanner and as a stationary scanner depending on the particular need.

Figure 21:
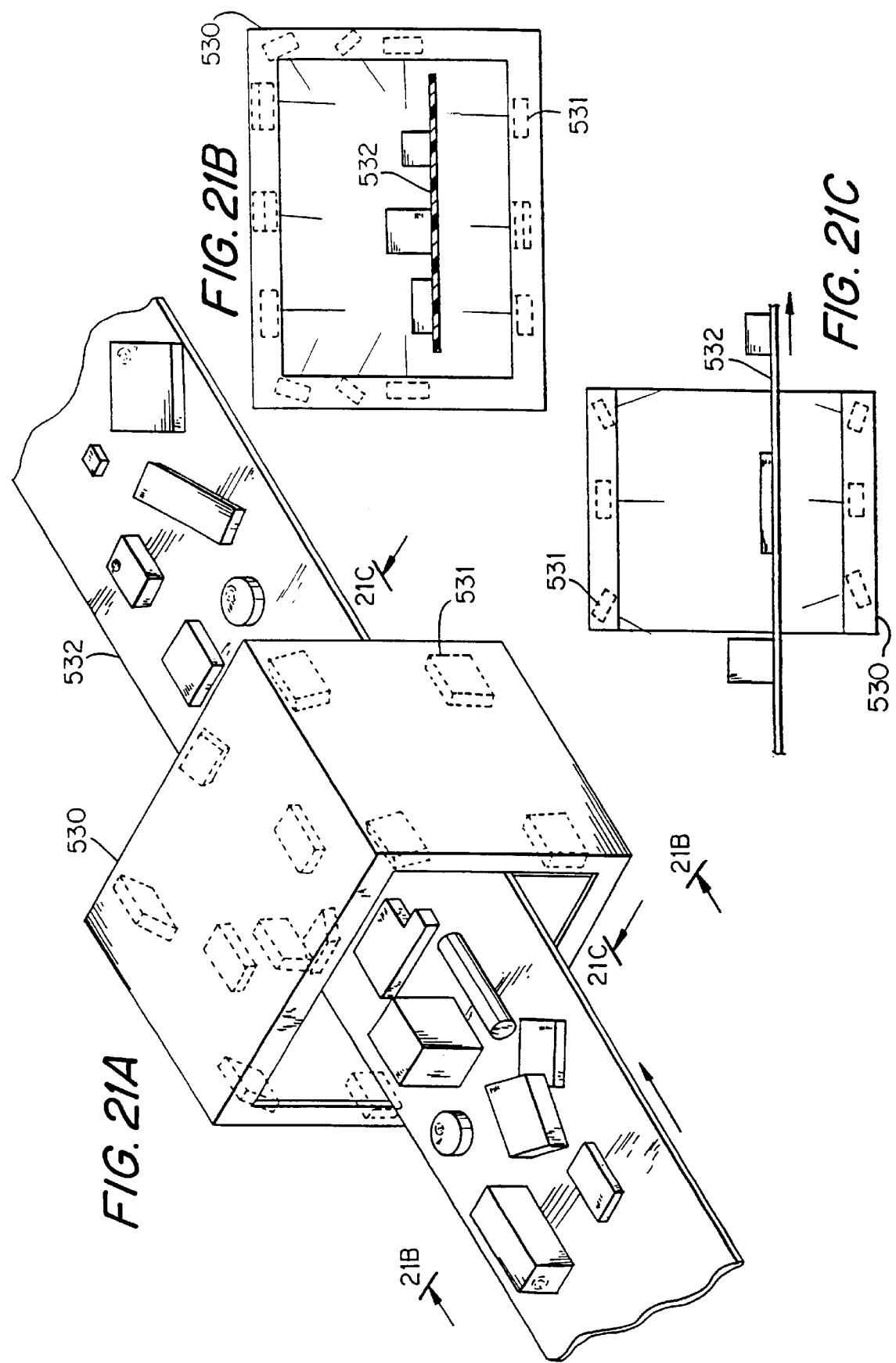
FIGS. 21A–21C depict a tunnel type scanner arrangement using multiple hybrid scanners of FIG. 15A, 15B or 15C.

FIGS. 21A–21C depict hybrid scanners of the type shown in FIGS. 15A, 15B or 15C arranged as part of a tunnel scanning system. The supporting structure 530 supports multiple hybrid scanners 531. The scanners are arranged to scan symbols on packages moved along on a conveyor belt 532. The scanners are arranged and oriented in a precise manner so as to facilitate the reading of symbols no matter what orientation the package may be in as it moves along on the conveyor belt 532. As perhaps best shown in FIGS. 21B and 21C, the conveyor belt 532 is preferably made of a light transparent material so that scan components 531 can be located below the conveyor belt to read symbols which having an orientation opposed to the surface of the conveyor belt. Additionally, hybrid scanners are also supported so as to read symbols which are on an upstream or downstream face of a package during their movement through the tunnel scanning system.

Figure 22:
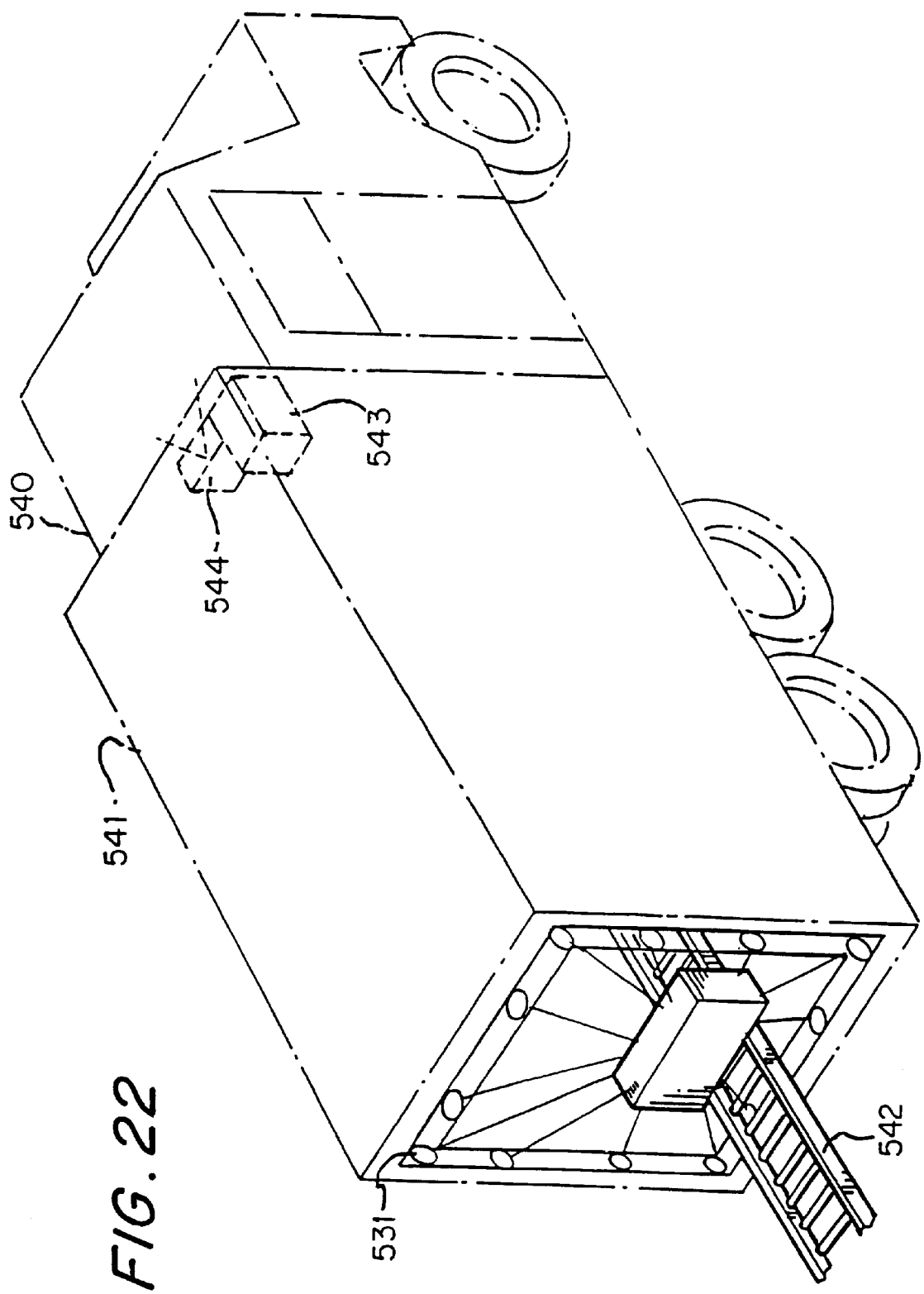
FIG. 22 depicts a truck mounting arrangement using multiple hybrid scanners of FIG. 15A, 15B or 15C.

FIG. 22 depicts a further tunnel scanner embodiment particularly suitable for locating and tracking packages being transported by truck. As shown, hybrid scanners 531 are supported around the opening in the trailer portion 541 of the truck 540. The scanning system can, for example, be activated upon opening the trailer door on the rear of the trailer portion 541. The hybrid scanners surround the opening and are oriented in a precise manner to provide a combined field of view which will allow a symbol located on a package being moved through the opening, for example, on slide 542 to be read no matter how the symbol may be oriented at the time it moves through the opening. If desired, a processor 543 and wireless transmitter or transceiver 544 can be mounted in the trailer portion 541 or elsewhere within truck 540 to process signals corresponding to an electrical signal generated by the CCD or photo detector of the hybrid scanner which obtains the read. The processed signal can if desired be communicated by wireless transmitter/transceiver 544 to a base station where the processed data is stored or utilized, for example, in notifying the owner of the goods being transported that shipment has begun or delivery has occurred. Processor 543 may also, if desired, include a storage device for storing the decoded information.

Figure 23:
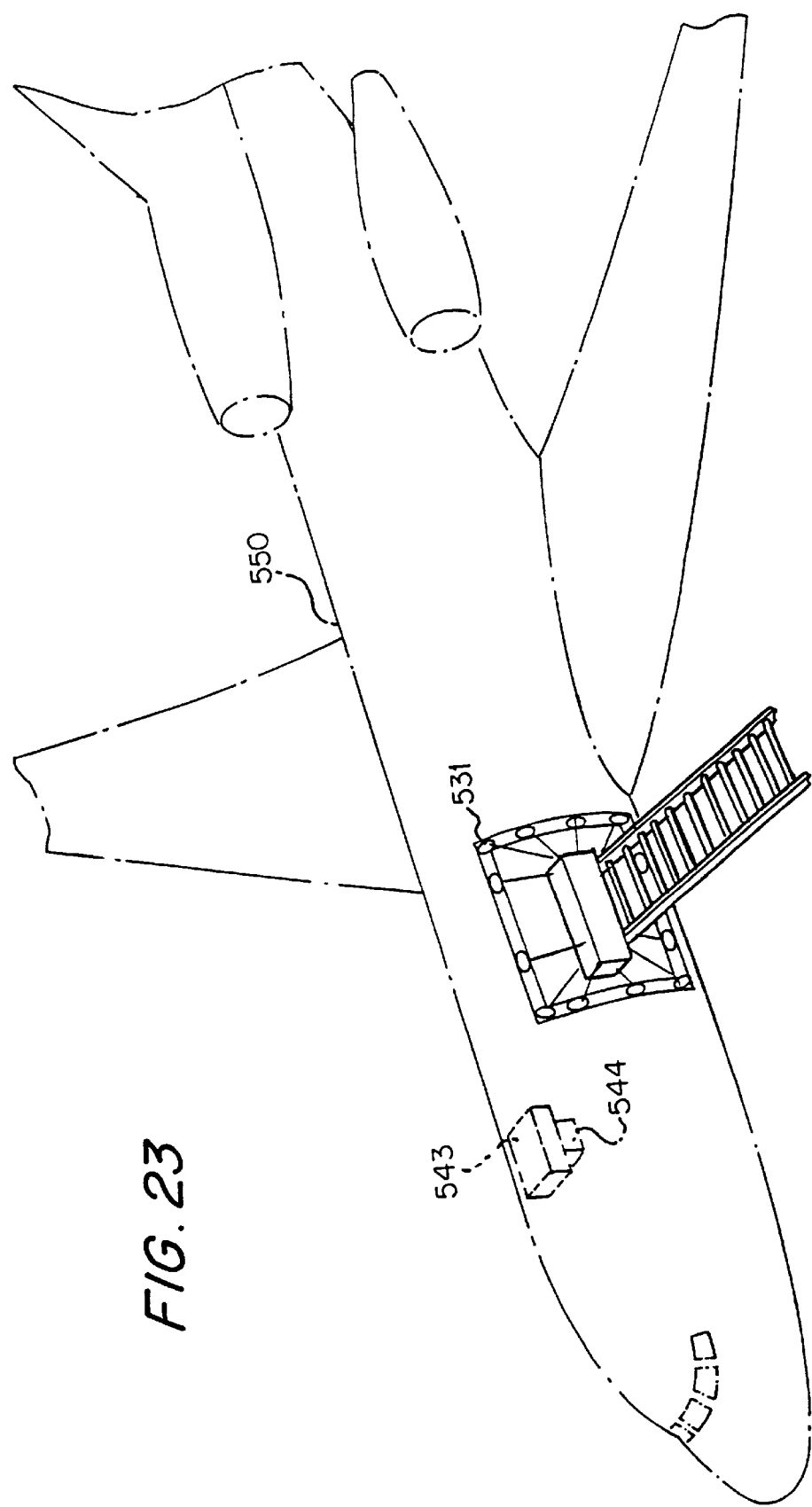
FIG. 23 depicts an aircraft mounting arrangement using multiple hybrid scanners of FIG. 15A, 15B or 15C.
Figure 24A:
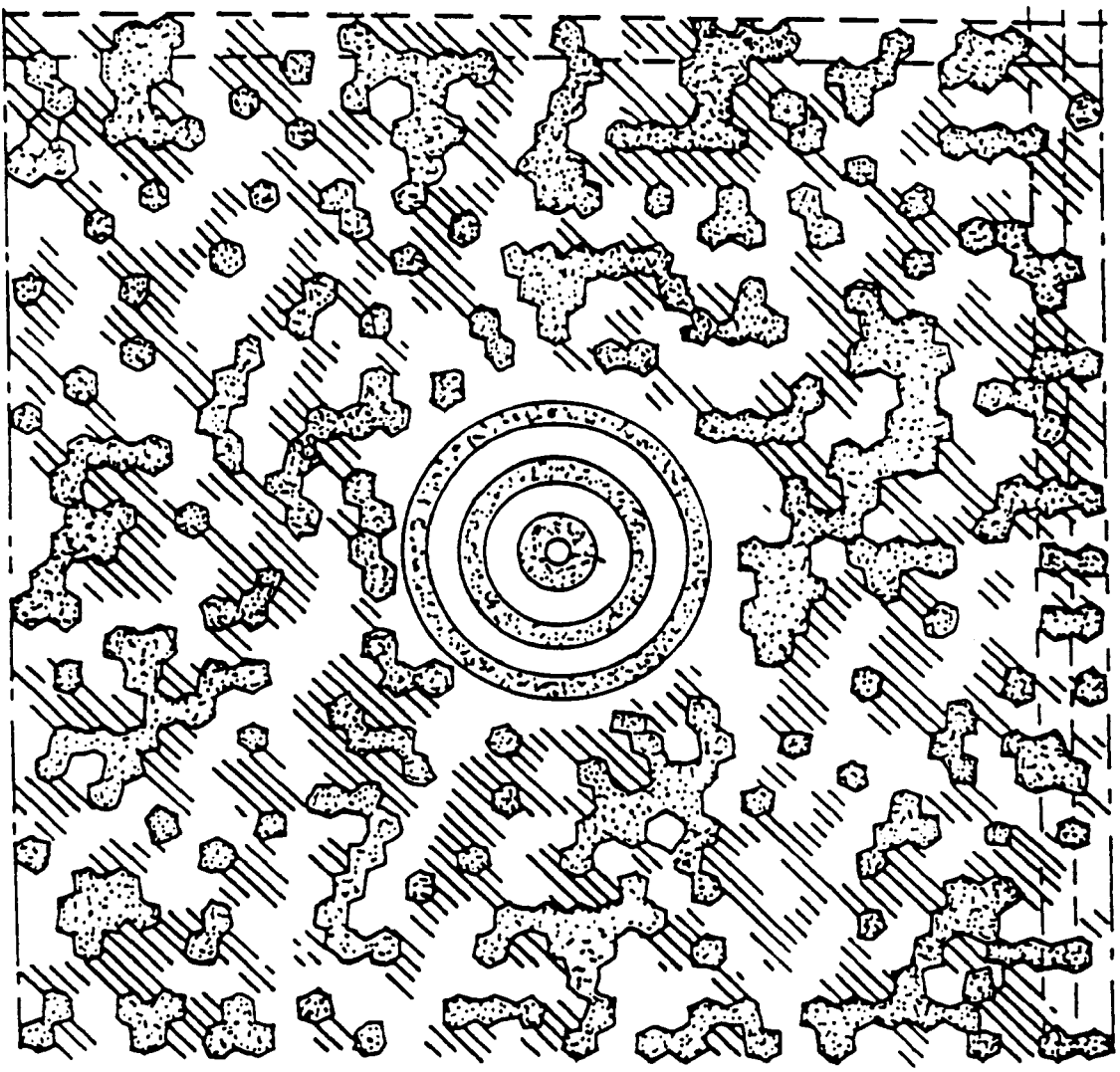
FIGS. 24A–24C depict symbols conforming to conventional matrix array and other symbologies.
Figures 24B, 24C:
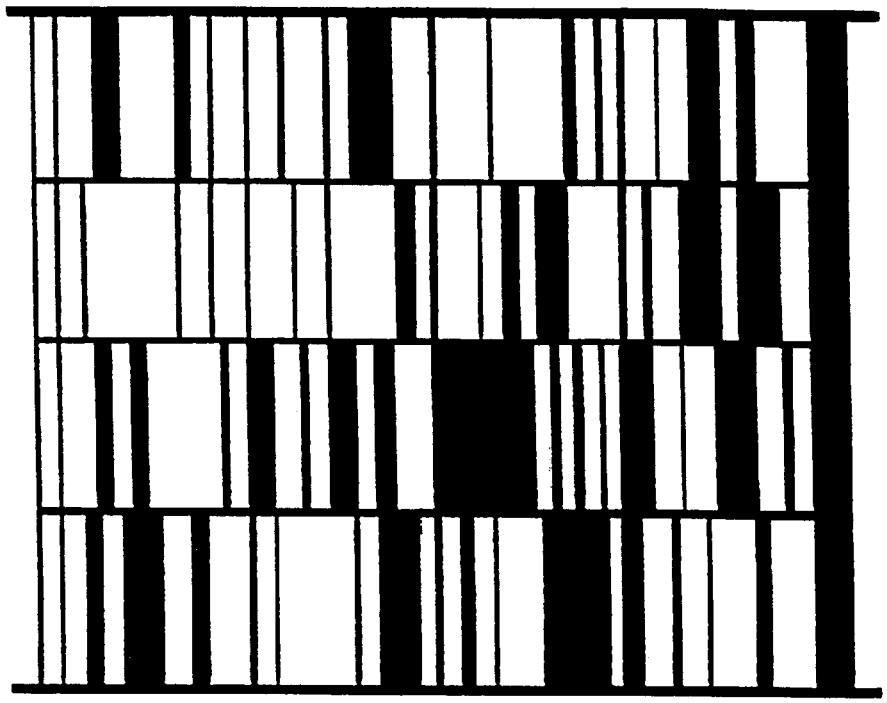

FIG. 23 shows a further application of a tunnel type scanning system utilizing the hybrid scanners of FIG. 15A, 15B or 15C. Similar to the system shown in FIG. 22, hybrid scanners 531 are supported around an opening provided in the aircraft 550. The scanners are precisely oriented to provide an acceptable combined field of view such that the target symbol on the package can be satisfactorily read no matter what the orientation of the package as it moves through the opening enclosed by the tunnel scanning system. If desired, a processor 543 and wireless transmitter or transceiver 544, of the type described in FIG. 22, can also be provided.

Although certain embodiments of the invention have been discussed without reference to the scanner housing, triggering mechanism and/or other features of conventional scanners, it will be understood that a variety of housing styles and shapes and triggering mechanisms could be used. Other conventional features can also be included if so desired. The invention is directed primarily to a portable hand-held scanning device and tunnel type scanner system, and thus is preferably implemented using miniaturized components such as those described herein or in the materials referenced herein, or otherwise known in the art. However, the scanner of the present invention is not limited to use in portable devices or tunnel type scanner systems and can also be easily adapted for use in any housing which might be desirable or required for a particular application.

Additionally, even though the present invention has been described with respect to reading one or two-dimensional bar code and matrix array symbols, it is not limited to such embodiments, but may also be applicable to other indicia scanning or data acquisition applications. It is conceivable that the method of the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand-held manner, a table top goose neck scanner attached to a flexible arm or mounting extending over the surface of the table or attached to the underside of the table top, or mounted as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user "aiming" the scanner at the target; the table top scanner operated by the target moved rapidly through the scan field, or "presented" to a scan pattern which is imaged on a background surface. Still other modalities within the scope of the present invention envision the articles being moved past a plurality of scan modules oriented in different directions so at least the field of view allows one scan of a symbol which may be arbitrarily positioned on the article.

The module would advantageously comprise an optics subassembly mounted on a support, and an image sensor component. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module or automatically. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast from a portable terminal to a stationary or mobile receiver.

It will be understood that each of the features described above, or two or more together, may find a useful application in other types of scanners and readers differing from the types described above.

As described above, an improved indicia reader without the limitations of prior art readers is provided. The indicia reader is capable of providing an elongated scan line across indicia located close to the scanner head. The reader can read one or two-dimensional or even more complex indicia. The reader is also capable of being aimed or oriented while imaging the indicia. Laser scanning with CCD imaging is provided. The reader is capable of reading indicia of different symbology types including indicia comprised of a matrix array of geometric set shapes such as UPSCODE(TM)

The novel features characteristics of the invention are set forth in the appended claims. The invention itself, however, as well as other features and advantages thereof, will be best understood by reference to a detailed description of a specific embodiment, when read in conjunction with the accompanying drawings.

What is claimed is:

1. A portable scanning head supported by a user for reading a bar code symbol on a target, comprising:
    a) a first assembly, including a visible laser light source for emitting a laser beam, and a scanner for scanning the laser beam so as to visually illuminate the target with a scanning line, thereby allowing the user to aim the head at the symbol to be read; and
    b) a second assembly, including a solid state sensor for imaging reflected light along two mutually orthogonal directions over a plane from the target, and for generating an electrical signal indicative of spatial intensity variations of the bar code symbol.

2. A reader for electro-optically reading indicia having parts of different light reflectivity, comprising:
    a) a first assembly, including a visible laser light source for directing a laser beam toward an indicium for rendering visible at least a target area on the indicium; and
    b) a second reader assembly, including a solid state sensor for imaging light reflected from the indicium along two mutually orthogonal directions over a plane, and for generating an electrical signal indicative of the imaged light.

3. The reader of claim 2, wherein the first assembly includes a scanner for sweeping the laser beam over the indicium.

4. The reader of claim 2, wherein the sensor is a charge coupled device array.

5. The reader of claim 2, wherein the sensor is a charge coupled device array having imaging elements arranged along the two orthogonal directions, for imaging the reflected light over a two-dimensional field of view.

6. The reader of claim 2, wherein the assemblies are independently operable.

7. The reader of claim 2, wherein the first assembly includes a scanner for sweeping the laser beam over the indicium to read the indicium; and wherein the second reader assembly is operative for scanning a field of view of the sensor over the indicium to read the indicium upon failure of the first assembly to read the indicium.

8. The reader of claim 2, wherein the second reader assembly is operative for scanning a field of view over the indicium to read the indicium; and wherein the first assembly includes a scanner for sweeping the light beam over the indicium to read the indicium upon failure of the second reader assembly to read the indicium.

9. The reader of claim 7; and further comprising a controller for initially enabling only one of the assemblies to read the indicium, and for subsequently enabling only the other of the assemblies to read the indicium upon failure of said one of the assemblies to read the indicium.

10. The reader of claim 9; and further comprising a user-selectable input for selecting which of the assemblies is the one to be initially enabled by the controller.

11. A bar code reader for reading symbols of differing light reflectivity, comprising:
    a) a first assembly, including a visible laser source for generating a laser beam to visually illuminate sequential portions of each symbol for rendering visible at least a target area on the respective symbol; and
    b) a second reader assembly, including a solid state sensor for imaging reflected light along two mutually orthogonal directions over a plane from each symbol, and for generating an electrical signal responsive to the imaged light indicative of the respective symbol.

12. A method of reading a bar code symbol having parts of different light reflectivity on a target, comprising the steps of:
    a) supporting a portable reader in a user's hand;
    b) emitting a visible scanning laser light beam from the reader so that the beam is scanned on a path to the target to enable the user to aim the reader with respect to the bar code symbol; and c) imaging reflected light along two mutually orthogonal directions over a plane from the bar code symbol on a solid state sensor to generate an electric signal indicative of imaged spatial light intensity variations of the bar code symbol, and to process the electrical signal to produce information represented by the bar code symbol.

13. A method of electro-optically reading indicia having parts of different light reflectivity, comprising the steps of:

a) directing a laser beam from a visible laser light source of a first assembly toward an indicium for rendering visible at least a target area on the indicium; and b) imaging light reflected from the indicium along two mutually orthogonal directions over a plane by a solid state sensor of a second reader assembly, and generating an electrical signal indicative of the imaged light.

14. The method of claim 13; and further comprising the step of sweeping the laser beam from the light source over the indicium to illuminate the indicium with an aiming line.

15. The method of claim 13, wherein the imaging step is performed by a charge coupled device.

16. The method of claim 13, wherein the imaging step is performed over a two-dimensional field of view of the sensor.

17. The method of claim 13; and further comprising the step of sweeping the laser beam over the indicium to read the indicium.

18. The method of claim 17; and further comprising the step of initially enabling only one of the assemblies to read the indicium and, upon failure of the one assembly to read the indicium, subsequently enabling only the other of the reader assemblies to read the indicium.

19. The method of claim 18; and further comprising the step of selecting by a user which of the assemblies is the one to be initially enabled.

* * * * *